US008819164B2

(12) United States Patent
Abzarian et al.

(10) Patent No.: US 8,819,164 B2
(45) Date of Patent: Aug. 26, 2014

(54) VERSIONING MANAGEMENT

(75) Inventors: David Abzarian, Kirkland, WA (US); Gerardo Diaz Cuellar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1132 days.

(21) Appl. No.: 11/897,890

(22) Filed: Aug. 31, 2007

(65) Prior Publication Data

US 2009/0063584 A1 Mar. 5, 2009

(51) Int. Cl.
*G06F 15/16* (2006.01)
(52) U.S. Cl.
USPC ............... 709/217; 709/220; 709/223; 726/1; 726/6
(58) Field of Classification Search
USPC ............................. 709/217, 220, 223; 726/1, 6
See application file for complete search history.

(56) References Cited

U.S. PATENT DOCUMENTS

| | | | |
|---|---|---|---|
| 5,204,961 A | 4/1993 | Barlow | |
| 6,920,558 B2 | 7/2005 | Sames et al. | |
| 6,941,355 B1* | 9/2005 | Donaghey et al. | 709/220 |
| 7,428,583 B1* | 9/2008 | Lortz et al. | 709/223 |
| 8,352,998 B1* | 1/2013 | Kougiouris et al. | 726/1 |
| 2001/0042213 A1 | 11/2001 | Jemes et al. | |
| 2003/0101203 A1* | 5/2003 | Chen et al. | 707/513 |
| 2003/0115484 A1 | 6/2003 | Mariconi et al. | |
| 2003/0229501 A1* | 12/2003 | Copeland et al. | 705/1 |
| 2005/0010765 A1 | 1/2005 | Swander et al. | |
| 2005/0102370 A1* | 5/2005 | Lin et al. | 709/217 |
| 2005/0102401 A1 | 5/2005 | Patrick et al. | |
| 2005/0182800 A1* | 8/2005 | Ashwin et al. | 707/203 |
| 2005/0193222 A1 | 9/2005 | Greene | |
| 2006/0090196 A1 | 4/2006 | van Bemmel et al. | |
| 2006/0167858 A1 | 7/2006 | Dennis et al. | |
| 2007/0162966 A1* | 7/2007 | Agrawal et al. | 726/6 |
| 2008/0244692 A1* | 10/2008 | Chang | 726/1 |

OTHER PUBLICATIONS

"Policy Driven Management for Distributed Systems", Morris Sloman, Journal of Network and Systems Management, Plenum Press, vol. 2, No. 4, 1994, 22 pgs.
"Security Policy Management", Juniper Networks Inc., Jun. 2005, 2 pgs.

(Continued)

*Primary Examiner* — Kyung H Shin
(74) *Attorney, Agent, or Firm* — John Jardine; Andrew Sanders; Micky Minhas

(57) ABSTRACT

Versioning management provides for efficient and effective handling of varying policy versions, client versions and client platform versions in one system. Software version negotiation provides for simplified, secure policy management in an environment supporting varying versions of the same software product. In conjunction with parameter stripping, which resolves differences among varying minor versions of a software policy, software version negotiation allows for management tools of one version to manage client software, clients and/or client platforms of another version. Policy schema translation, in conjunction with parameter stripping as needed, provides a mechanism for converting policies that normally would be impossible to interpret on varying clients and/or client platforms to policy versions that can be understood by these clients and/or client platforms. Version targeting allows an administrator to push a policy to specific clients and/or client platforms to, among other things, address identified security issues or to provide version specific application enablement or enhancement. Together, these various versioning management methodologies simplify administration of a system consisting of varying policy versions, client versions and/or client platform versions while enhancing the flexibility of the system to apply policy throughout the system or any portion thereof.

20 Claims, 25 Drawing Sheets

(56) References Cited

OTHER PUBLICATIONS

"Tools for Domain-based Policy Management of Distributed Systems", N. Damianou, N. Dulay, E. Lupu, M. Stoman and T. Tonouchi, IEEE Network Operations and Management Symposium, 2002, 15 pgs.

"Towards Effective Security Policy Management for Heterogeneous Network", Lawrence TA\EO and Gail-Joon Ahn, Eighth IEEE International Workshop on Policies for Distributed Systems and Networks, 2007, Abstract.

* cited by examiner

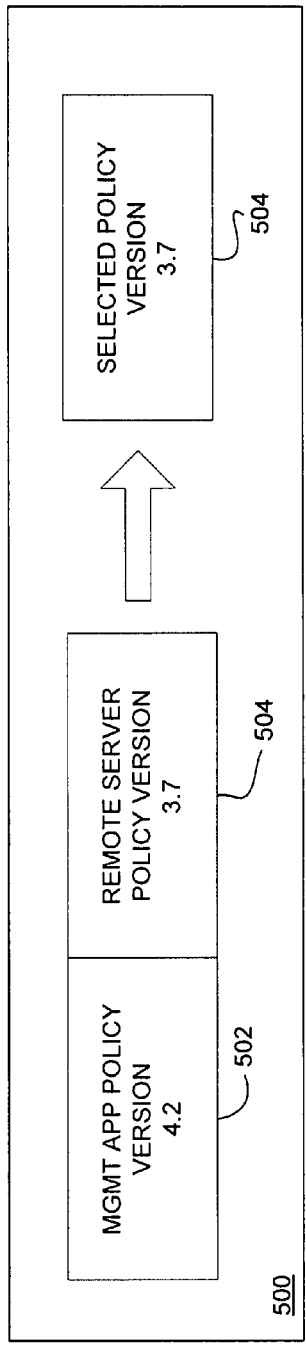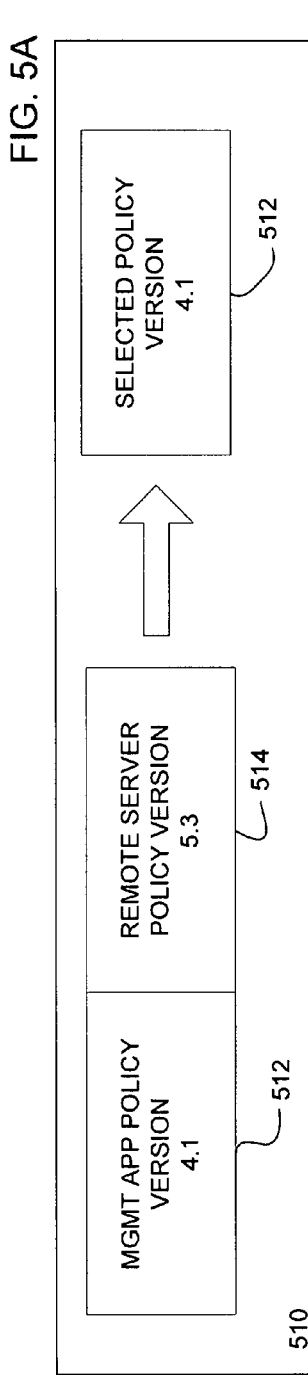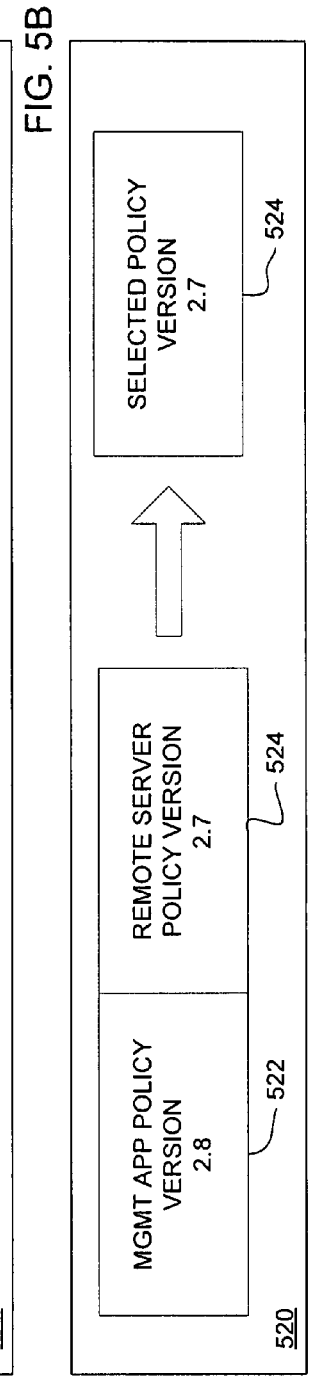

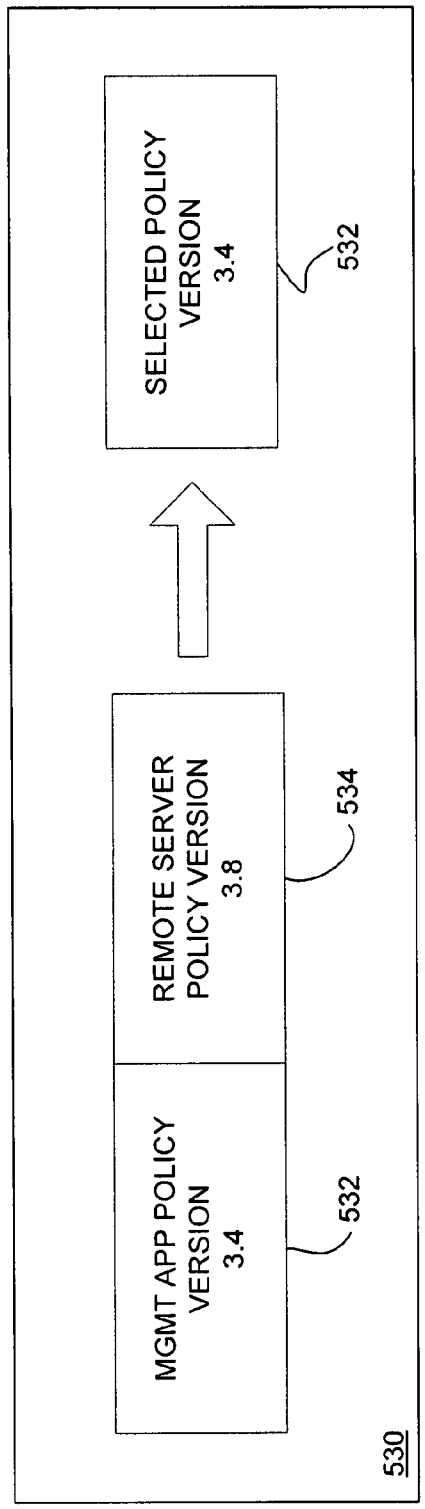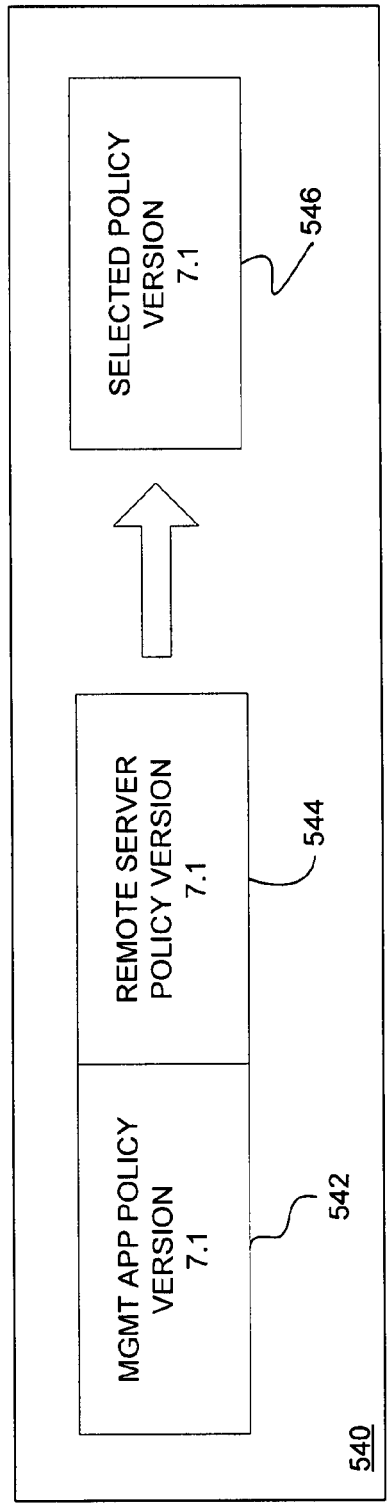

VERSIONING MANAGEMENT

BACKGROUND

A common environment scenario is mixed-mode, wherein differing versions of the same product, or software policy, are supported by various clients and/or remote servers. There are generally two kinds of product revisions: major and minor. A major revision generally results in a new set, or subset, of management interfaces and/or policy structure. A minor revision, in contrast, generally only entails the addition and/or modification of one or more fields and/or parameters of a management interface or policy structure of the software policy. Both major and minor product revisions, however, result in differing versions that are generally incompatible with prior versions, at least in so far as the changes to the product that resulted in the revision.

In many mixed-mode environments there are also, or alternatively, differing client versions, i.e., differing operating systems supported by various clients, and/or differing supported platforms or platform versions that require alternative software product versions.

Managing such mixed-mode environments presents unique challenges to computer-based system administrators and application developers attempting to query and control various clients simultaneously. For example, in currently known systems clients supporting a smaller major or minor version can not be queried with product versions with greater major and/or minor version values. This is generally because the lower version product hosted on any particular client is typically unable to interpret API ("application programming interface") calls and/or policy parameters that are unique to the higher version product.

As another example, currently known mixed-mode environment systems do not support the ability to push, or otherwise implement or deploy, software policies with minor version revisions to clients supporting the same major version but differing, smaller, minor versions. This is generally because smaller minor version products are typically unable to interpret policy parameters that are unique to the higher version product.

The inability to implement one new product version in a mixed-mode environment can generate vast logistical and/or managerial challenges for system administrators who must keep track of which clients can, and do, support a particular new version software policy and which clients do not. The inability to implement one new product version in a mixed-mode environment can also result in workload, managerial and maintenance concerns for application developers who may be required to develop and maintain various versions of a product that can be used with differing client operating systems and/or differing client platforms.

The inability to implement one new product version in a mixed-mode environment can also result in important system security problems, e.g., when dealing with products, such as, but not limited to, firewall policies, that are designed to address and/or otherwise enforce security policy in a system.

Thus, it would be effective and efficient if a mixed-mode environment accommodated software policies of a greater major version managing clients supporting lesser major versions. It would likewise be effective and efficient if, in a mixed-mode environment, software policies of a greater minor version could be used to manage clients supporting lesser minor versions. Similarly, efficiencies could be gained in situations where software policies of a lesser major version could be used to manage clients maintaining greater major versions, and circumstances in which software policies of a lesser minor version could be used to manage clients supporting greater minor versions.

It would also be beneficial if, in a mixed-mode environment, a software policy could be authored for and enforced on only a specific platform version or versions. Such version targeting will allow, among other things, a system administrator to push, or otherwise implement or deploy, a policy to a specific platform version or versions in order to address unique security issues faced by the respective platform version(s). Version targeting will also allow a system administrator to provide specific application enablement to respective platform version(s).

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Embodiments discussed herein include methodology for software version negotiation and for parameter stripping. In an embodiment a client of a system and a remote server of the system use software version negotiation to identify the policy version that will be used between them. In an aspect of this embodiment parameter stripping is employed as needed to handle minor version differences between the policy version identified to be used between a client and a remote server and the policy version of either the respective client or remote server.

Embodiments discussed herein further include methodology for policy schema translation. In an embodiment a new policy version is translated, or otherwise converted, into one or more other policy versions of lesser value. In an embodiment the new policy version and the translated policy versions are deployed throughout the system to those clients that support the respective new policy version or any one translated policy version.

Embodiments discussed herein also include methodology for version targeting. In an embodiment a deployment command includes one or more targeting parameters that each identifies a client version and/or client platform version for which a specific policy version is to be deployed. In an aspect of this embodiment unidentified client versions and/or client platform versions will not accept or, alternatively, use, or else be provided, the deployed policy version that the respective client version and/or client platform version supports.

BRIEF DESCRIPTION OF THE DRAWINGS

These and other features will now be described with reference to the drawings of certain embodiments and examples which are intended to illustrate and not to limit the invention, and in which:

FIGS. 5A, 5B, 5C, 5D and 5E depict illustrative examples of selected software versions negotiated between a client and a remote server in a managed environment system.

DETAILED DESCRIPTION

In the following description, for purposes of explanation, numerous specific details are set forth in order to provide a thorough understanding of the present invention. It will be apparent, however, to one skilled in the art that the invention may be practiced without these specific details. In other instances, well-known structures and devices are shown in block diagram form in order to avoid unnecessarily obscuring the invention. Any and all titles used throughout are for ease of explanation only and are not for use in limiting the invention.

Figure 1:
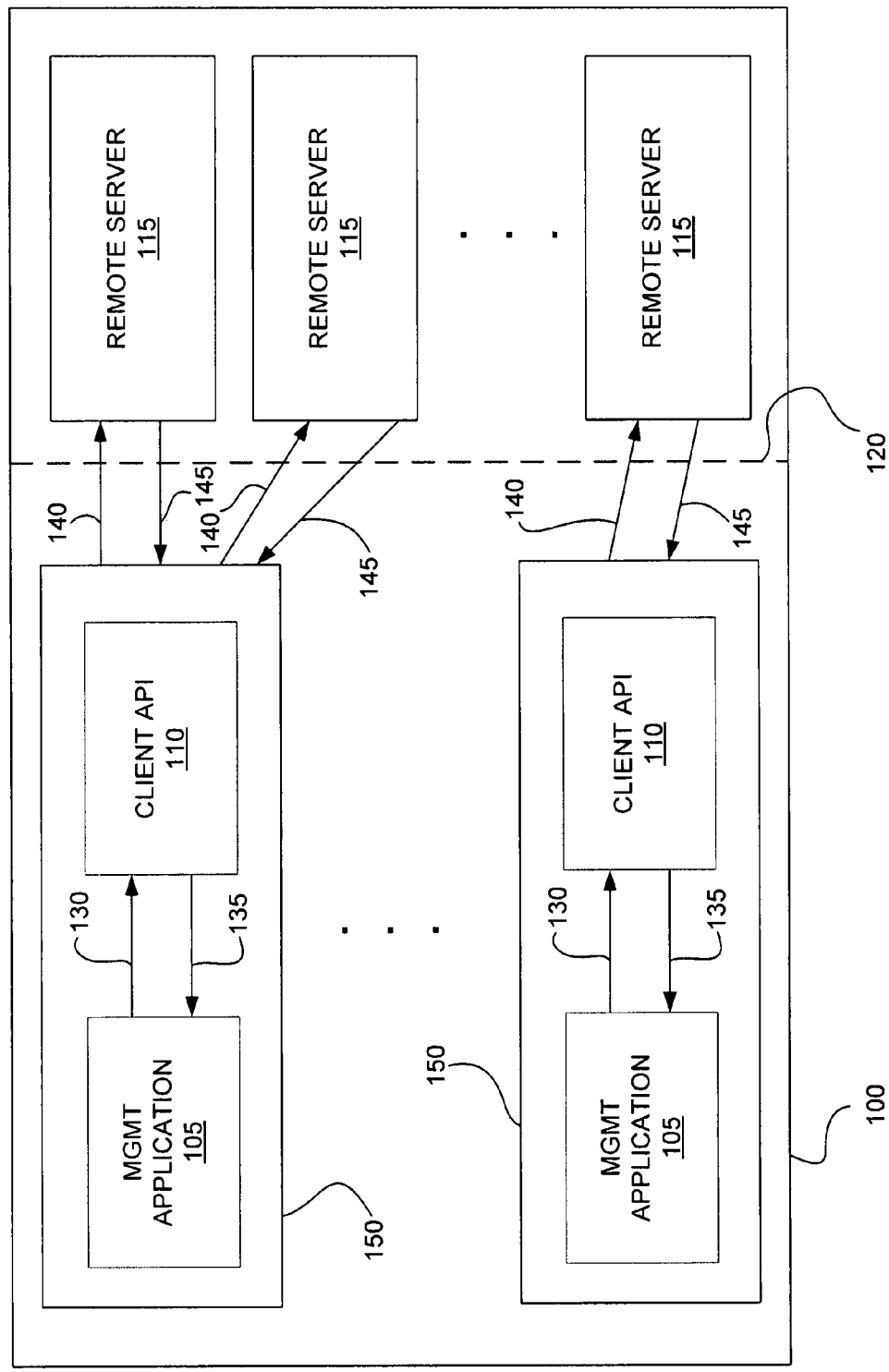
FIG. 1 is an embodiment managed environment system supporting mixed-modes, i.e., simultaneously supporting differing versions of the same software.

A simplified embodiment managed environment system 100, depicted in FIG. 1, can support utilizing management tools in a mixed-mode environment, i.e., an environment accommodating differing product, or policy, versions. An example of a product, or policy, with different versions is a firewall software program for providing secure computing environments.

In the embodiment managed environment system 100 a management application ("mgmt app") 105 can pass information and/or commands 130 to a client API 110 and receive information and/or commands 135 from the client API 110. In an embodiment a mgmt app 105 and a client API 110 constitute a management console 150. In an embodiment there can be one or more management consoles 150 in a managed environment system 100.

In the embodiment managed environment system 100 a client API 110 of a management console 150 can pass information and/or commands 140 to one or more remote servers 115 and receive information and/or commands 145 from one or more remote servers 115. In an embodiment a host/process boundary 120 exists between the management console(s) 150 and the remote server(s) 115.

In an embodiment a mgmt app 105 is, or otherwise supports, a product, or policy, with its own particular product version. In an embodiment a remote server 115 can also support the same product, or policy. In an embodiment the version of any one product of, or otherwise supported by, a mgmt app 105 can be the same or can be different, i.e., is a different product revision, than the version of the same product supported by a remote server 115.

In an embodiment there are two kinds of product revisions: major and minor. In an embodiment a major product revision may result in a new set of management interfaces and/or policy structure. In an embodiment a minor product revision may result in the addition, deletion or modification of one or more fields or parameters of a policy rule of the product.

In an embodiment product, or policy, versions are of the form x.y, where x indicates the major revision, or version, value and y indicates the minor revision, or version, value. In an embodiment larger numbers for x and y indicate a more current version than smaller numbers. Thus, for example, product, or policy, version 4.2 is more current than product, or policy, version 3.2 as version 4.2 has a larger major version value (4) than version 3.2 (with major version value 3). Likewise, product, or policy, version 4.2 is more current than product, or policy, version 4.1, even though both product versions have the same major version value (4), because version 4.2 has a larger minor version value (2) than version 4.1 (with minor version value 1).

Figure 9A:
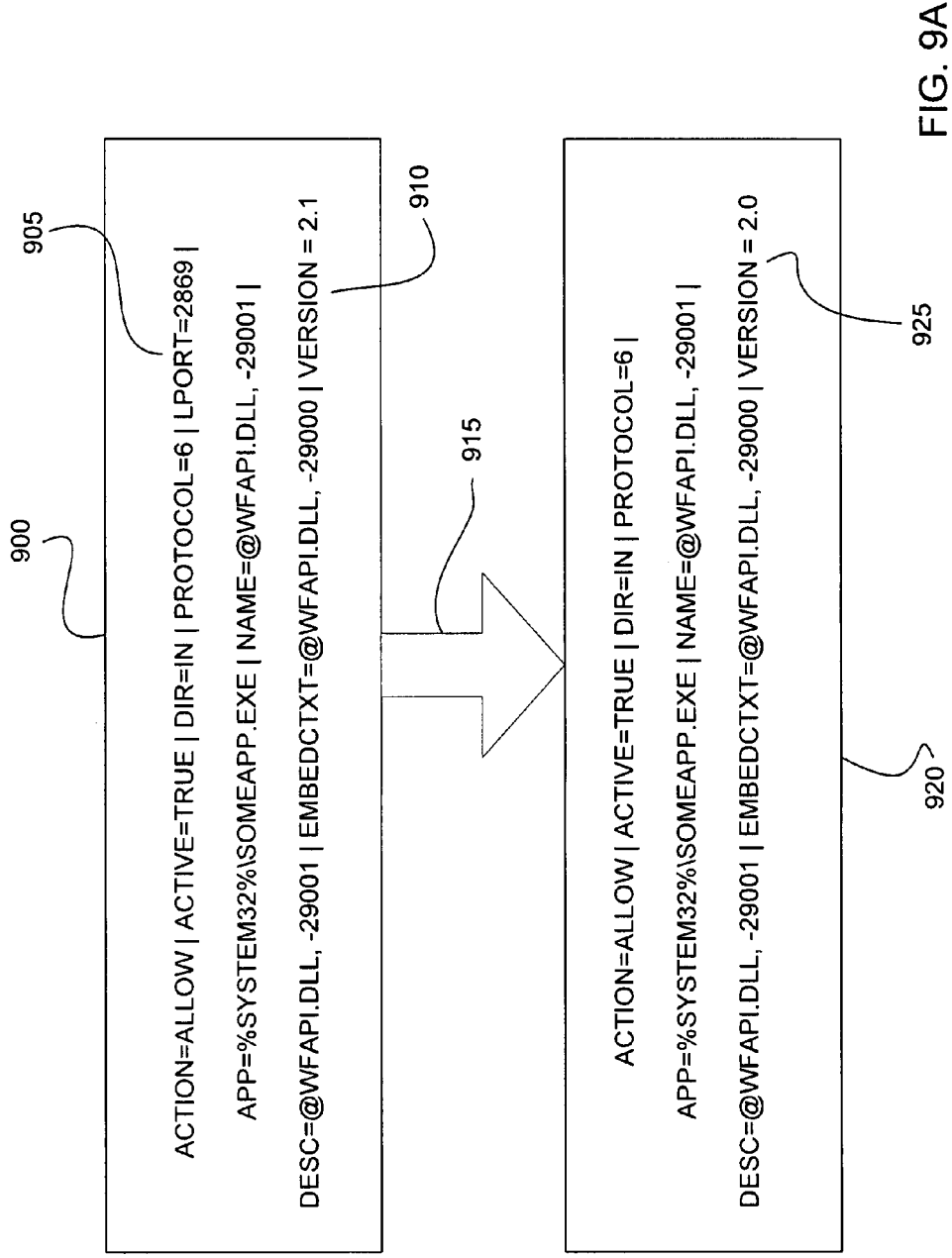
FIGS. 9A and 9B illustrate examples of parameter stripping.

A major product revision may result in the addition of a new policy rule, or object, to a software product. Referring to FIG. 9A, rule 900 is an exemplary policy rule, or object, of a product with a version value 910 of 2.1. In this example policy rule 900 was added into the software product in version 2.0; policy rule 900 did not exist in any earlier version 1.x of the same product.

In contrast, again for example, a minor product revision may result in the addition of a new parameter to an existing policy rule. Referring once more to FIG. 9A, parameter 905 ("LPORT") exists in the policy rule 900 of version 910 (value 2.1), but is not a part of the same policy rule 920 of a different, earlier, minor version 925 (value 2.0) of the same product.

In an embodiment each policy has a version value of the form x.y (major.minor version value). In an embodiment each rule, or object, of a policy also has a specific version value of the form x.y (major.minor version value).

In an embodiment a managed environment system 100 contains a mgmt app 105 using a policy with a major version value that is greater than the major version value of the same policy maintained by a remote server 115. In an embodiment a managed environment system 100 contains a mgmt app 105 using a policy with a major version value that is less than the major version value of the same policy maintained by a remote server 115.

In an embodiment a managed environment system 100 supports a mgmt app 105 using a policy with the same major version value as the major version value of the same policy maintained by a remote server 115, but with a minor version value that is greater than the minor version value of the policy maintained by the remote server 115. In an embodiment a managed environment system 100 supports a mgmt app 105 using a policy with the same major version value as the major version value of the policy maintained by a remote server 115, but with a minor version value that is less than the minor version value of the policy maintained by the remote server 115.

In an embodiment a managed environment system 100 contains a mgmt app 105 using a policy with the same major version value as the major version value of the policy maintained by a remote server 115 and with the same minor version value as the minor version value of the policy maintained by the remote server 115.

Figure 2:
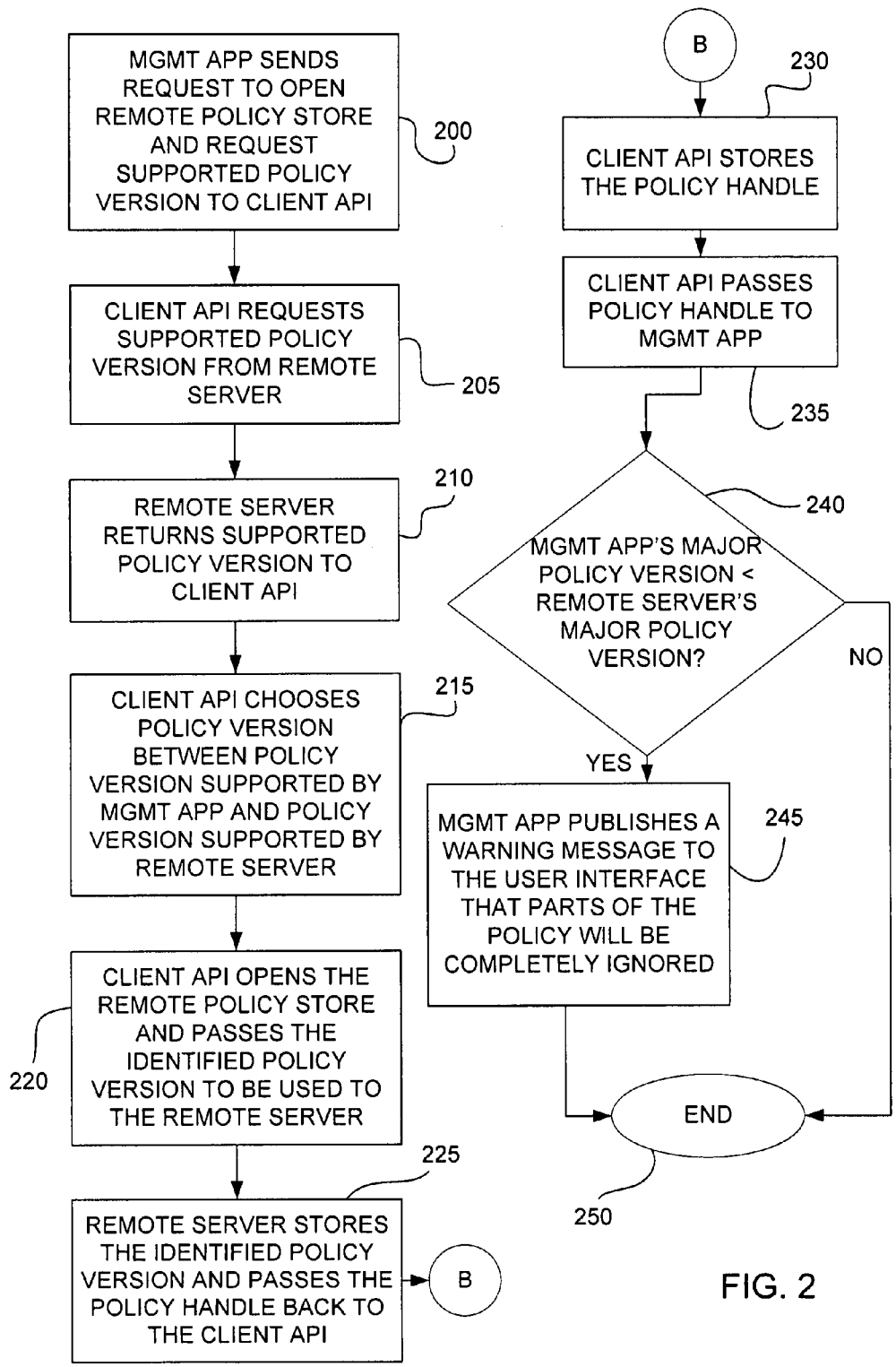
FIG. 2 illustrates an embodiment logic flow for negotiating the software version to be used between a client and a remote server in a managed environment system.

FIG. 2 illustrates an embodiment logic flow for a methodology for software version negotiation. While the following discussion is made with respect to systems portrayed herein, the operations described may be implemented in other systems. Further, the operations described herein are not limited to the order shown. Additionally, in other alternative embodiments more or fewer operations may be performed.

In an embodiment the mgmt app sends a request to its corresponding client API to open a remote policy store and request the policy version maintained by a particular remote server 200. In an embodiment the client API then sends a request to the remote server for its supported policy version 205. In an embodiment the remote server retrieves and returns its supported policy version to the client API 210. In an embodiment the client API chooses the policy version to be used between the policy version maintained by the mgmt app and the policy version hosted by the remote server 215. In an embodiment the client API then opens the remote policy store and passes the chosen policy version value to be used to the remote server 220.

In an embodiment the remote server stores the chosen policy version value selected by the client API and passes the appropriate policy handle back to the client API 225. In an embodiment a policy handle references a corresponding policy object and allows a local or remote application that utilizes the policy management APIs to identify and manipulate the policy objects on a specified host, i.e., on a specified computing platform. In an embodiment a policy object can be any policy store, i.e., set of policy rules that govern the implementation of a particular policy of a software program or package, such as, but not limited to, a firewall policy store, an IPsec rule store, etc. In an embodiment a policy object can also, or otherwise, be a subset of a policy store, i.e., one or more rules of a set of policy rules.

In an embodiment the client API stores the policy handle received from the remote server 230. In an embodiment the client API forwards the policy handle received from the remote server to the mgmt app 235.

In an embodiment at decision block 240 the mgmt app determines whether the policy major version value supported by the mgmt app is less than the policy major version value maintained by the remote server. If the mgmt app's policy major version value is less than that of the policy major version value maintained by the remote server, in an embodiment the mgmt app publishes a warning message to the user interface that parts of the policy will be completely ignored 245. In an embodiment the policy parts that will be completely ignored are those policy objects, or rules, that exist in the remote server's policy version but are not supported by the mgmt app's policy version.

In an embodiment the logic flow for software version negotiation is finalized 250.

Figure 3:
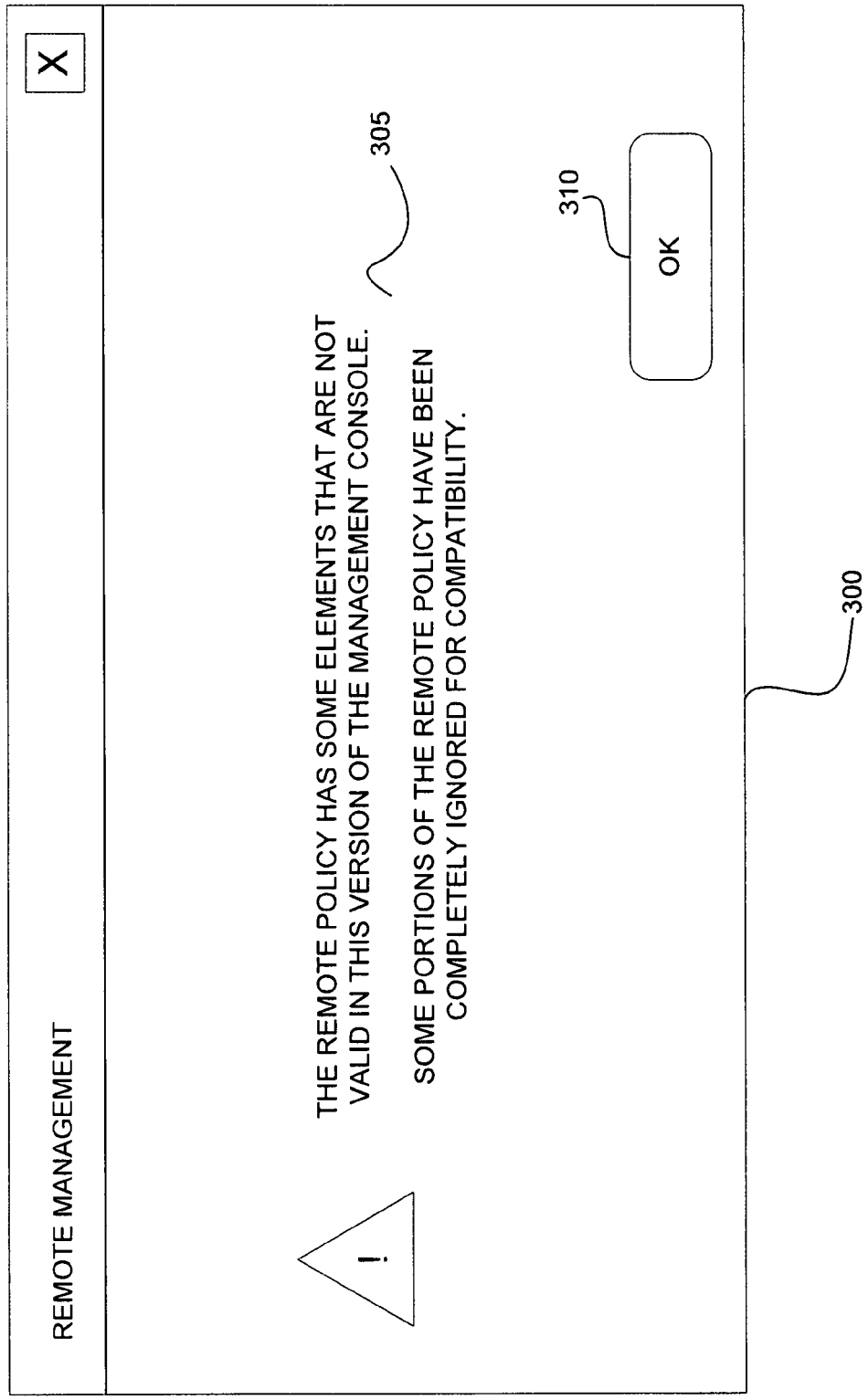
FIG. 3 depicts an exemplary warning message published to a user interface (UI) when a remote server supports a greater major version of software than the version hosted by a client in the managed environment system.

FIG. 3 depicts an embodiment exemplary warning message 300 published by a mgmt app 105 when its policy major version value is less than the major version value of the policy supported by a remote server 115. The embodiment warning message 300 includes text 305 that indicates that the remote server's policy version has some elements, or objects or rules, that are not valid, i.e., are not supported, in the mgmt app's policy version and therefore, some portions of the remote server's policy version are completely ignored during execution, or implementation.

In an embodiment the warning message 300 contains an "OK" button 310 that a user must click on, or otherwise activate, to acknowledge that the user has seen the warning message 300.

Referring back to decision block 240 of FIG. 2, in an alternative embodiment, if the mgmt app's policy major version value is determined to be greater than that of the major version value of the same policy maintained by the remote server the mgmt app will publish a warning message to the user interface. In an aspect of this alternative embodiment the published warning message in this situation indicates that the remote server's policy version does not support some elements, or objects or rules, of the policy and that these unsupported policy rules are ignored during policy execution, or implementation.

In an embodiment, if the mgmt app's policy major version value is the same as the remote server's policy major version value, all rules of the respective policy version are supported and will be implemented. However, in this situation all aspects, i.e., parameters, of the policy may not be implemented, depending on the policy minor versions supported respectively by the mgmt app 105 and the remote server 115.

Figure 4:
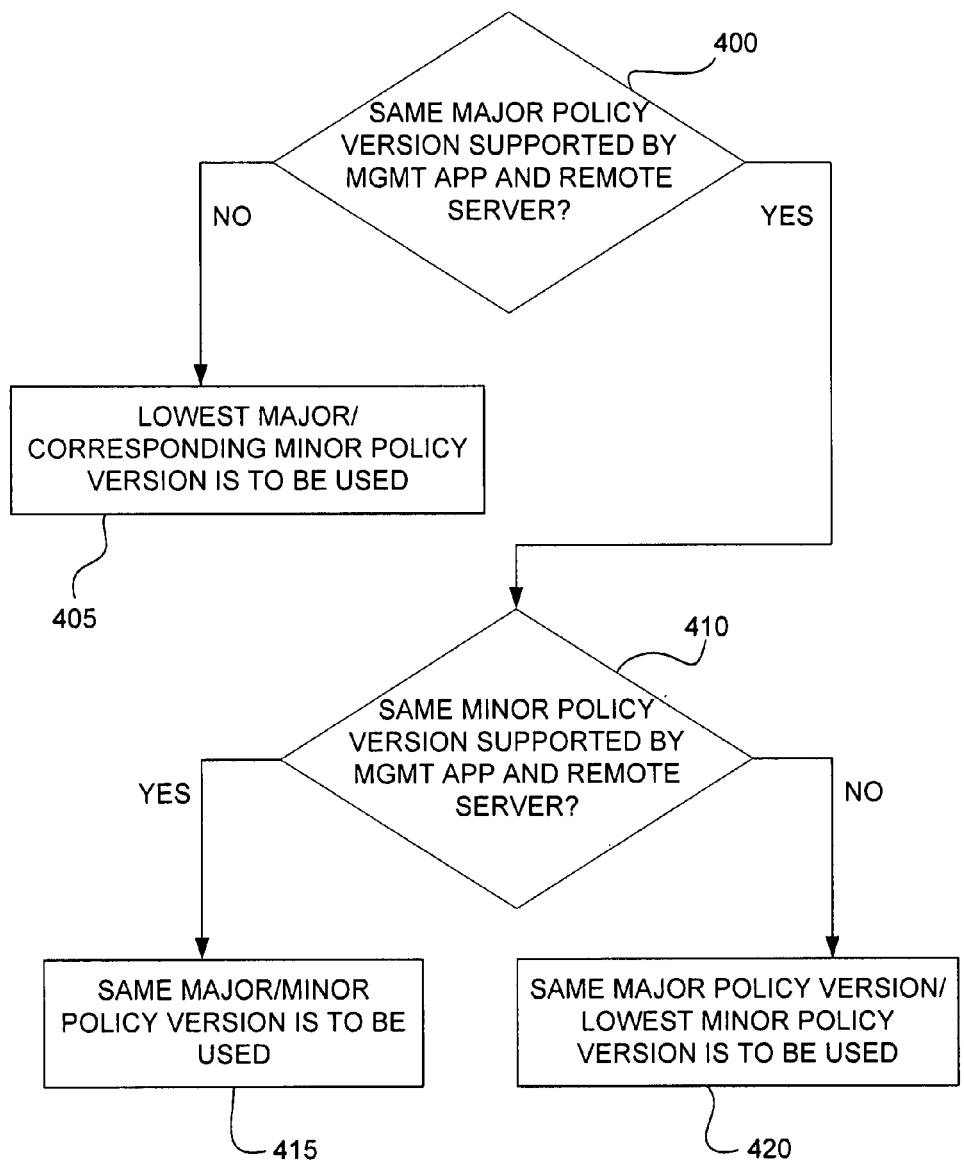
FIG. 4 illustrates an embodiment logic flow for choosing the software version to be used between a client and a remote server.

FIG. 4 illustrates an embodiment logic flow for a methodology for a client API to choose the policy version 215 to be used between a mgmt app 105 and a remote server 115. While the following discussion is made with respect to systems portrayed herein, the operations described may be implemented in other systems. Further, the operations described herein are not limited to the order shown. Additionally, in other alternative embodiments more or fewer operations may be performed.

At decision block 400 of FIG. 4 a determination is made as to whether the same policy major version is maintained by the mgmt app and the remote server. If no, the client API chooses the policy version with the lower major version value, and its corresponding minor version, to be used 405.

Referring to FIG. 5A, as an example 500, if the mgmt app's policy version 502 is 4.2 and the remote server's policy version 504 is 3.7, the mgmt app 105 and the remote server 115 support different policy major versions, and in an embodiment the client API 110 will choose the policy with the lower major version value (3), and its corresponding minor version (7), to be used. Thus in example 500 policy version 504 maintained by the remote server 115, value 3.7, will be chosen by the client API 110 to be used.

As another example 510 depicted in FIG. 5B, if the mgmt app's policy version 512 is 4.1 and the remote server's policy version 514 is 5.3, the mgmt app 105 and the remote server 115 again support different policy major versions, and in an embodiment the client API 110 will choose the policy with the lower major version value (4), and its corresponding minor version (1), to be used. Thus in example 510 policy version 512 maintained by the mgmt app 105, value 4.1, will be chosen by the client API 110 to be used.

When the client API 110 must choose the policy version with the lower major version value between the mgmt app's policy version and the remote server's policy version, the policy can still be used to manage one or more remote clients associated with the remote server. In this situation, however, one or more objects, or elements, or rules, of the policy with the higher major version value will be ignored in policy execution, or implementation.

Referring again to FIG. 4, if the same major version of the policy is supported by both the mgmt app and the remote server, at decision block 410 a determination is made as to whether the mgmt app and the remote server maintain the same minor version of the policy. If no, the client API chooses the policy with the lower minor version value to be used 420.

Referring to FIG. 5C, as an example 520, if the mgmt app's policy version 522 is 2.8 and the remote server's policy version 524 is 2.7, the mgmt app 105 and the remote server 115 support the same policy major version (2) but different policy minor versions. In this embodiment example 520 the client API 110 will choose the lower policy minor version (7) to be used. Thus, in example 520 the policy version 524 maintained by the remote server 115, value 2.7, will be chosen by the client API 110 to be used.

As another example 530 of FIG. 5D, if the mgmt app's policy version 532 is 3.4 and the remote server's policy version 534 is 3.8, the mgmt app 105 and the remote server 115 again support the same policy major version (3) but differing policy minor versions. In this embodiment example 530 the client API 110 will choose the lower policy minor version (4) to be used. In example 530 therefore, the policy version 532 maintained by the mgmt app 105, value 3.4, will be chosen by the client API 110 to be used.

When the client API 110 must choose the policy with the lower minor version value between the mgmt app's policy version and the remote server's policy version, all objects, or elements, or rules, of the policy version supported by both the mgmt app 105 and the remote server 115 will be used. However, one or more parameters of one or more objects supported in the higher valued minor version will be ignored in policy execution, or implementation.

Referring once again to FIG. 4, at decision block 410 if a determination is made that the same policy minor version is maintained by the mgmt app and the remote server the mgmt app and the remote server support the same policy major/minor version x.y. This same policy major/minor version x.y is the version chosen by the client API to be used 415. Under these conditions all objects, or elements, or rules, of the policy version supported by both the mgmt app 105 and the remote server 115 will be used and no parameter stripping is necessary.

Referring to FIG. 5E, as an example 540 of the same policy major/minor version being supported by the mgmt app 105 and the remote server 115, the mgmt app's policy version 542 is 7.1 and the remote server's policy version 544 is also 7.1. In this embodiment situation the client API 110 chooses the policy major/minor version 546 supported by both the mgmt app 105 and the remote server 115, value 7.1, to be used.

Figure 6:
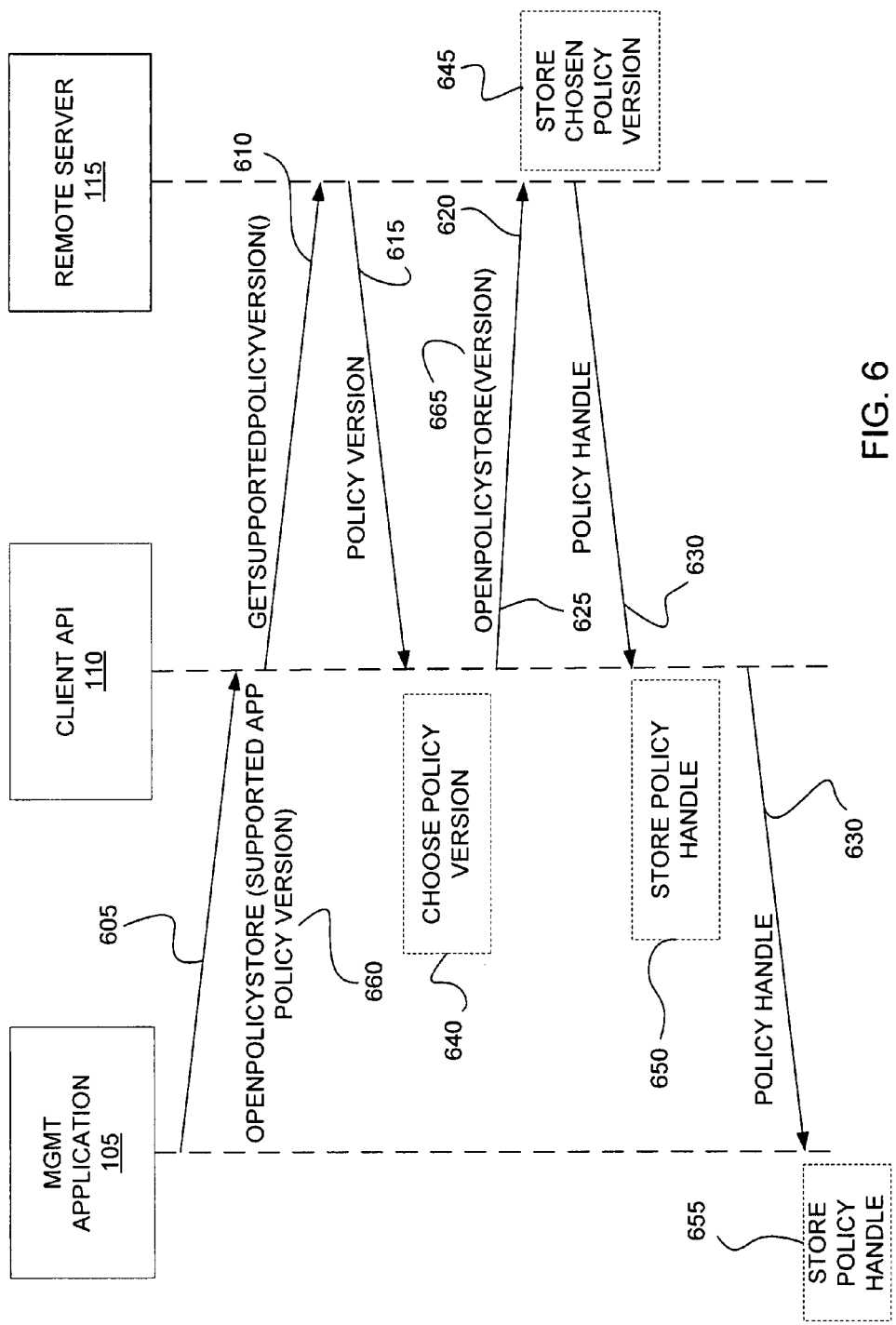
FIG. 6 depicts an embodiment process flow for negotiating the software version to be used between a client and a remote server in a managed environment system.

FIG. 6 is an embodiment processing flow for software version negotiation, i.e., for identifying the policy version to be used between a mgmt app 105 and a remote server 115. In an embodiment the mgmt app 105 sends a request 605 to its corresponding client API 110 to open a remote policy store. In an embodiment request 605 is an OPENPOLICYSTORE call. In an embodiment request 605 includes as a parameter the mgmt app's supported policy major/minor version value 660.

In an embodiment, upon receiving the request 605 the client API 110 sends a request 610 to a remote server 115 for the remote server 115 to identify its corresponding policy major/minor version. In an embodiment request 610 is a GETSUPPORTEDPOLICYVERSION call.

In an embodiment, upon receiving the request 610 the remote server 115 identifies the requested policy version and passes this policy version value 615 back to the client API 110. In an embodiment, upon receiving the policy version value 615 maintained by the remote server 115, the client API 110 compares the remote server's policy version value with the policy version value supplied by the mgmt app 105. In an embodiment the client API 110 chooses the policy version value 640 to be implemented. In an aspect of this embodiment the client API 110 chooses the lower, or smaller, policy version value if one of the policy versions supported by the mgmt app 105 and the remote server 115 is a lesser value than the other.

In an embodiment, after the client API 110 chooses the policy version value to be implemented the client API 110 sends a request 620 to the remote server 115 for the remote server 115 to open its remote policy store. In an embodiment request 620 is an OPENPOLICYSTORE call. In an embodiment request 620 includes as a parameter 665 the value of the policy major/minor version chosen by the client API 110 to be implemented.

In an embodiment, upon receiving the request 620 the remote server 115 stores the chosen policy major/minor version 645. In an embodiment, after receiving the request 620 the remote server 115 passes the appropriate policy handle 630 for the chosen policy version to the client API 110. In an embodiment the client API 110 stores the policy handle 650 received from the remote server 115.

In an embodiment the client API 110 then forwards the received policy handle 630 to the mgmt app 105. In an embodiment the mgmt app 105 stores the policy handle 655 received from the client API 110.

Once a policy version has been negotiated, or otherwise chosen or identified, the embodiment managed environment system 100, when acting on an object command, determines if parameter stripping is necessary. Embodiment object commands include, but are not limited to, enumerate (or read), add, set, and delete.

In an embodiment parameter stripping is performed, as necessary, when the policy minor version value supported by a remote server 115 is of a different value than the corresponding policy minor version value supported by a mgmt app 105 issuing a policy object command to the remote server 115.

In an embodiment the mgmt app 105 of a management console 150 does not perform parameter stripping. In an embodiment, if a remote server 115 maintains a policy with a greater minor version value than the corresponding policy maintained by a mgmt app 105 and the mgmt app 105 issues an object command to the remote server 115 that necessitates the remote server 115 forwarding one or more objects to the mgmt app 105, e.g., an enumerate (or "enum") object command, the remote server 115 will check for, and as necessary, perform parameter stripping. In an embodiment, if a mgmt app 105 maintains a policy with a greater minor version value than the corresponding policy maintained by a remote server 114 and the mgmt app 105 issues an object command to the remote server 115 that includes the forwarding of one or more objects to the remote server 15, e.g., an add object command, then the client API 110 associated with the mgmt app 105 will check for, and as necessary, perform parameter stripping.

Figure 7A:
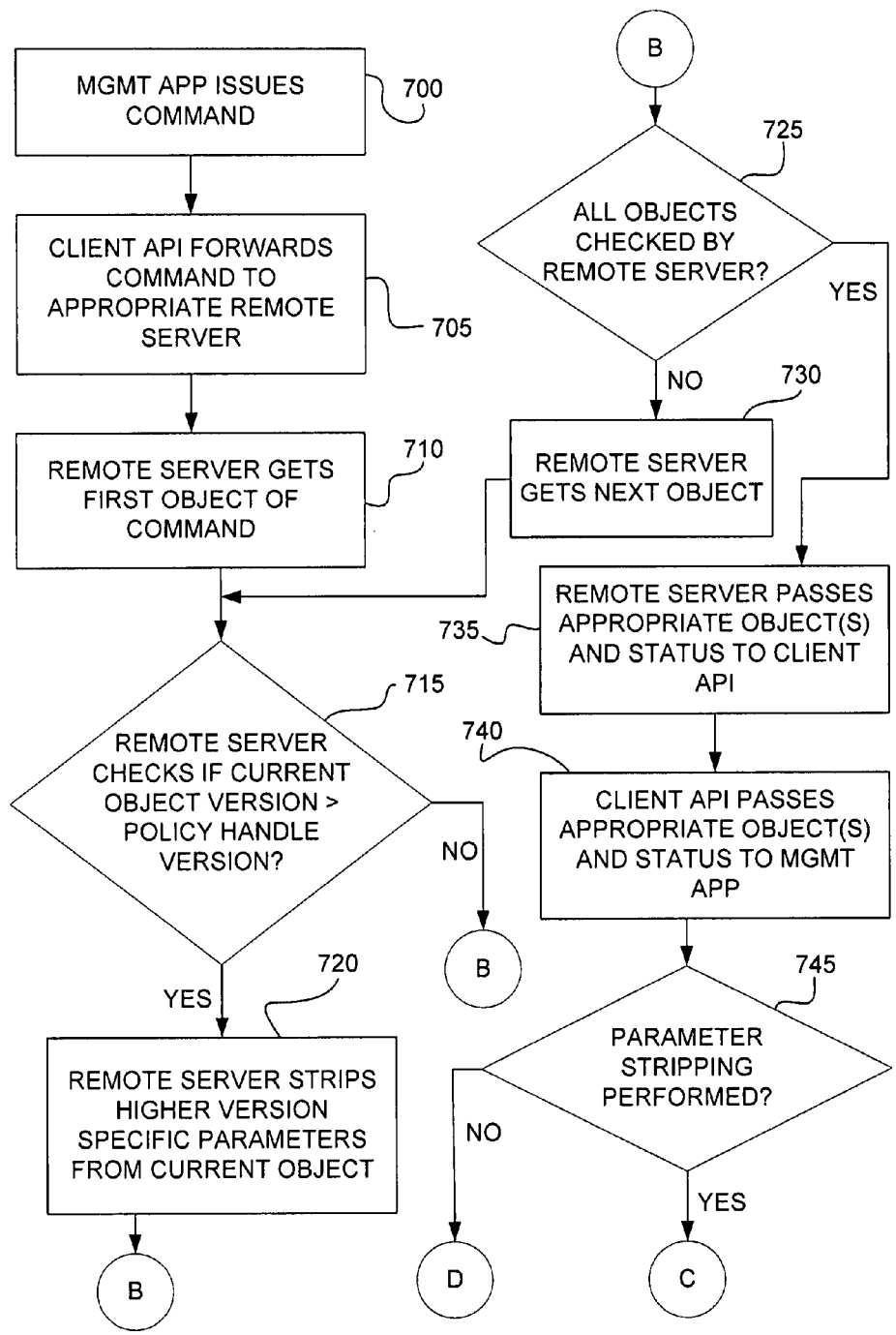
FIGS. 7A and 7B illustrate an embodiment logic flow for parameter stripping an object command when the negotiated software minor version is less than the software minor version supported by the remote server processing the object command.
Figure 7B:
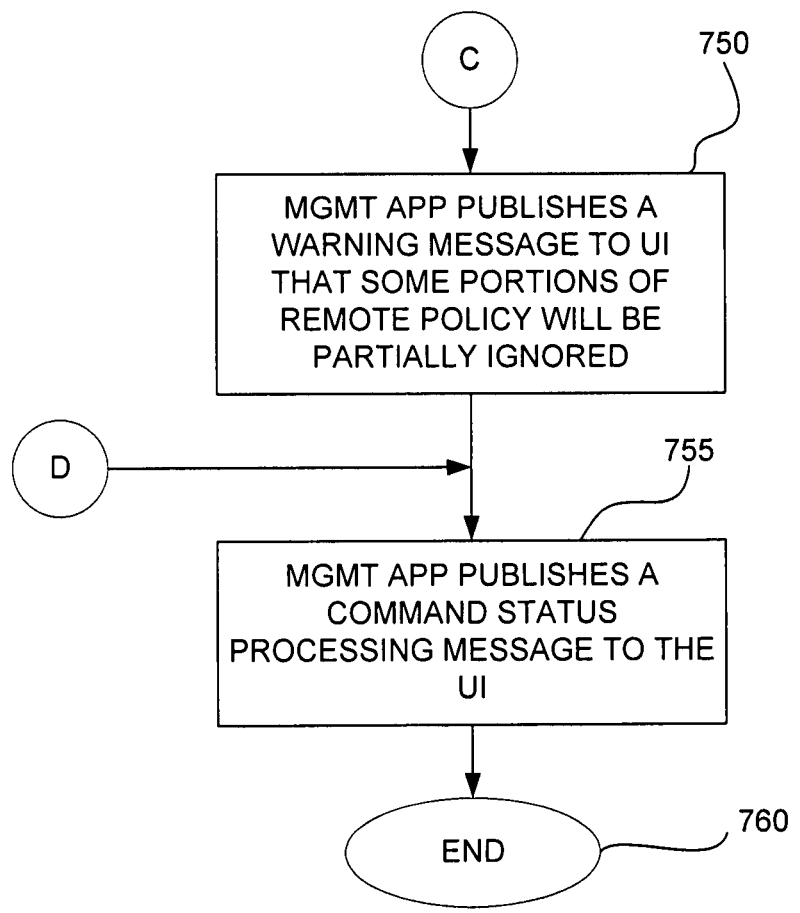

FIGS. 7A and 7B illustrate an embodiment logic flow for a methodology for parameter stripping when the policy minor version supported by a remote server 115 has a larger value than the corresponding policy minor version supported by a mgmt app 105. While the following discussion is made with respect to systems portrayed herein, the operations described may be implemented in other systems. Further, the operations described herein are not limited to the order shown. Additionally, in other alternative embodiments more or fewer operations may be performed.

Referring to FIG. 7A, in an embodiment a mgmt app of a management console issues a command 700 which is forwarded to the client API of the management console. In the logic flow of FIGS. 7A and 7B the command issued by the mgmt app requires a remote server to forward one or more objects to the mgmt app, e.g., an enum command which requests a list of all the objects of a specified policy. In an embodiment the client API forwards the command from the mgmt app to the appropriate remote server 705.

As discussed, in an embodiment each object, or element or rule, of a policy has its own specific version value. Thus, in an embodiment, upon receiving the command from the client API the remote server gets a first, current, object of the respective policy 710 that is responsive to the command, and at decision block 715 makes a determination if the current object's version is greater than the policy handle's version which reflects the chosen policy version to be implemented. If no, parameter stripping is not necessary for this current object and the remote server determines at decision block 725 whether all the objects of the policy responsive to the command have been checked for potential parameter stripping.

If, however, the current object's version is greater than the policy handle's version, the remote server strips the parameters from the current object that do not exist, or are otherwise not supported, in the policy handle's version 720. The remote server than determines at decision block 725 whether all the objects of the policy responsive to the command have been checked for potential parameter stripping.

If there are remaining objects to be checked for possible parameter stripping the remote server gets the next, new current, object of the policy 730 and returns to decision block 715 to determine whether the now current object's version is greater than the policy handle's version.

Once all appropriate policy objects have been checked for potential parameter stripping, in an embodiment the remote server passes the objects responsive to the mgmt app's command to the client API 735. For example, if the mgmt app issued an enum command for a particular policy the remote server now passes all the objects of the policy to the client API 735. In this embodiment, if an object responsive to the command required parameter stripping the remote server passes the parameter stripped version of the object to the client API 735.

In an embodiment the remote server includes with the object(s) sent to the client API an identification of each object's status 735. In an embodiment an object's status indicates whether or not the object was parameter stripped.

In an embodiment the remote server includes with the object(s) sent to the client API an error code 735. In an embodiment the error code indicates the status of the implementation of the mgmt app command, e.g., command ran successfully, command failed, etc.

In an embodiment the client API passes the objects received from the remote server to the mgmt app 740. In an embodiment the client API also passes each object's status received from the remote server to the mgmt app 740. In an embodiment the client API passes the error code received from the remote server to the mgmt app 740.

At decision block 745 the mgmt app makes a determination based on the various objects' status whether parameter stripping was performed on one or more policy objects. If yes, as shown in FIG. 7B, the mgmt app publishes a warning message to the user interface (UI) indicating that one or more parameters in one or more of the policy objects in the version supported by the remote server are not valid in the respective policy version supported by the mgmt app 750. In an aspect of this embodiment the warning message also indicates that one or more portions of the remote policy version are, therefore, partially ignored 750.

In an embodiment the mgmt app also, or otherwise, uses the received error code to compose and publish a message to the UI indicating the status of the command processing 755, i.e., a command processing status message. In an aspect of this embodiment the mgmt app only publishes a command processing status message if the command failed to process completely and/or correctly.

Whether or not any warning message is published, thereafter the processing of the current command is finalized 760.

Figure 8:
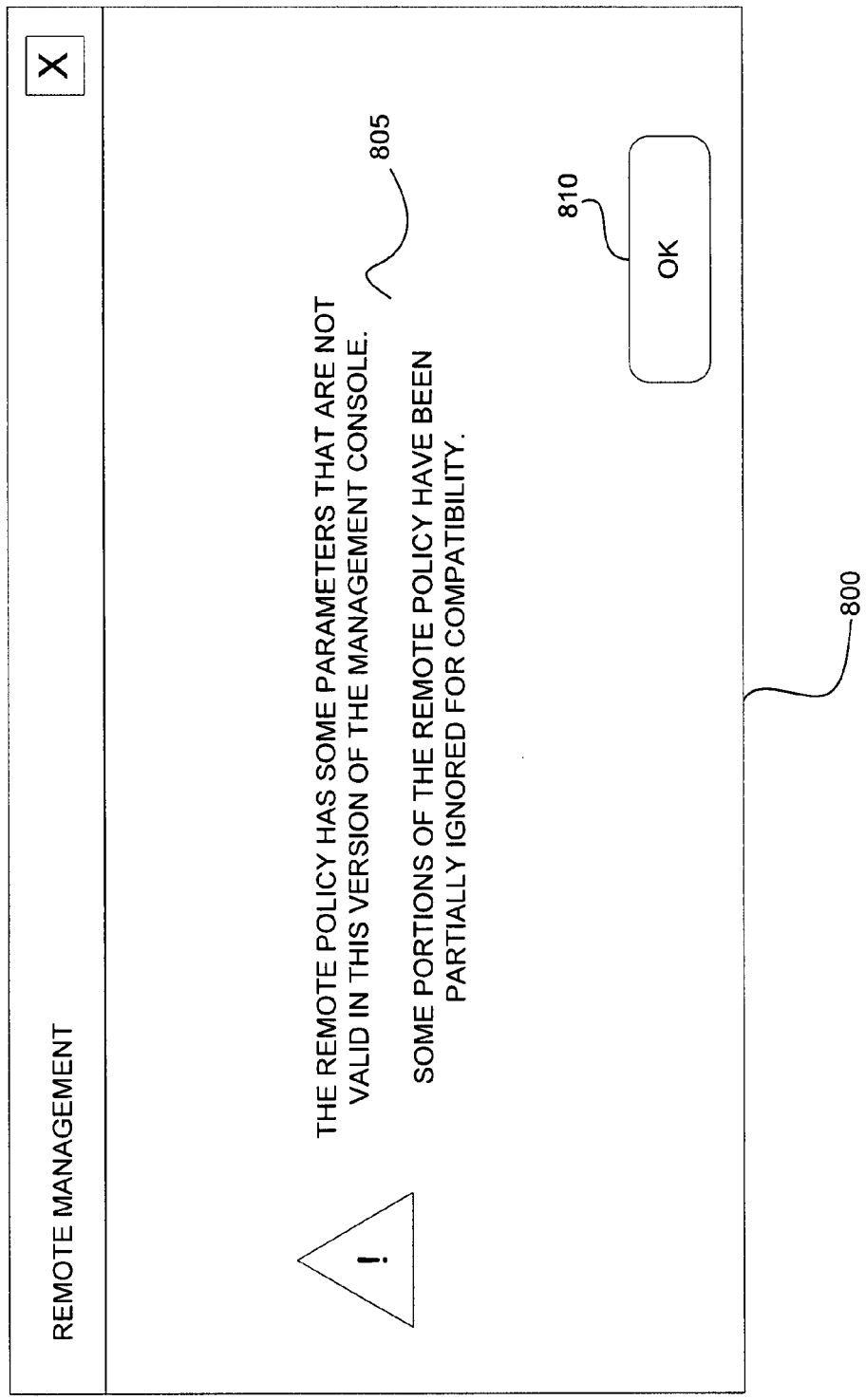
FIG. 8 depicts an exemplary warning message published to a user interface (UI) when a remote server supports a greater minor version of software than the version hosted by a client in the managed environment system.

FIG. 8 depicts an embodiment exemplary warning message 800 published by a mgmt app 105 when its policy minor version value is less than the minor version value of the policy supported by a remote server 115. The embodiment warning message 800 includes text 805 that indicates that the remote server's policy version has one or more objects that have one or more parameters that are not valid, i.e., are not supported, in the mgmt app's policy version and therefore, some portions of the remote server's policy version are partially ignored during policy execution, or implementation.

In an embodiment the warning message 800 contains an "OK" button 810 that a user must click on, or otherwise activate, to acknowledge the user has seen the warning message 800.

An example of parameter stripping when the policy handle minor version is different than the policy minor version supported by a remote server 115 is depicted in FIG. 9A. In FIG. 9A assume that a mgmt app 105 is attempting to enumerate, or read, from a remote server 115 the objects, or rules, of a policy that in the remote server's policy version contain object, or rule, 900 with an object version value 910 of 2.1. Also assume the policy handle version value, i.e., the policy version chosen by the client API 110 during software version negotiation, and the policy version supported by the mgmt app 105, has a value of 2.0. In this example the mgmt app's policy minor version value (0), and the resultant policy handle's minor version value (0), for object, or rule, 920 of FIG. 9A is less than the corresponding remote server's policy minor version value (1) for the corresponding object 900.

In the example of FIG. 9A, object 900, version 910 of a value 2.1, has an additional, local port value, parameter 905 that does not exist, and is therefore not supported, in the corresponding object 920, version 925 of a value 2.0. Thus, in this example parameter stripping is required to strip, or otherwise delete, parameter 905 (LPORT=2869) from object

900. As shown in the corresponding object, or rule, 920, all other parameters that exist in object 900 remain after parameter stripping.

In the example of FIG. 9A, assuming a mgmt app 105 is attempting to enumerate the policy objects from a remote server 115 wherein the mgmt app's minor policy version is smaller than the remote server's corresponding minor policy version, the remote server 115 performs the parameter stripping as necessary.

Figure 9B:
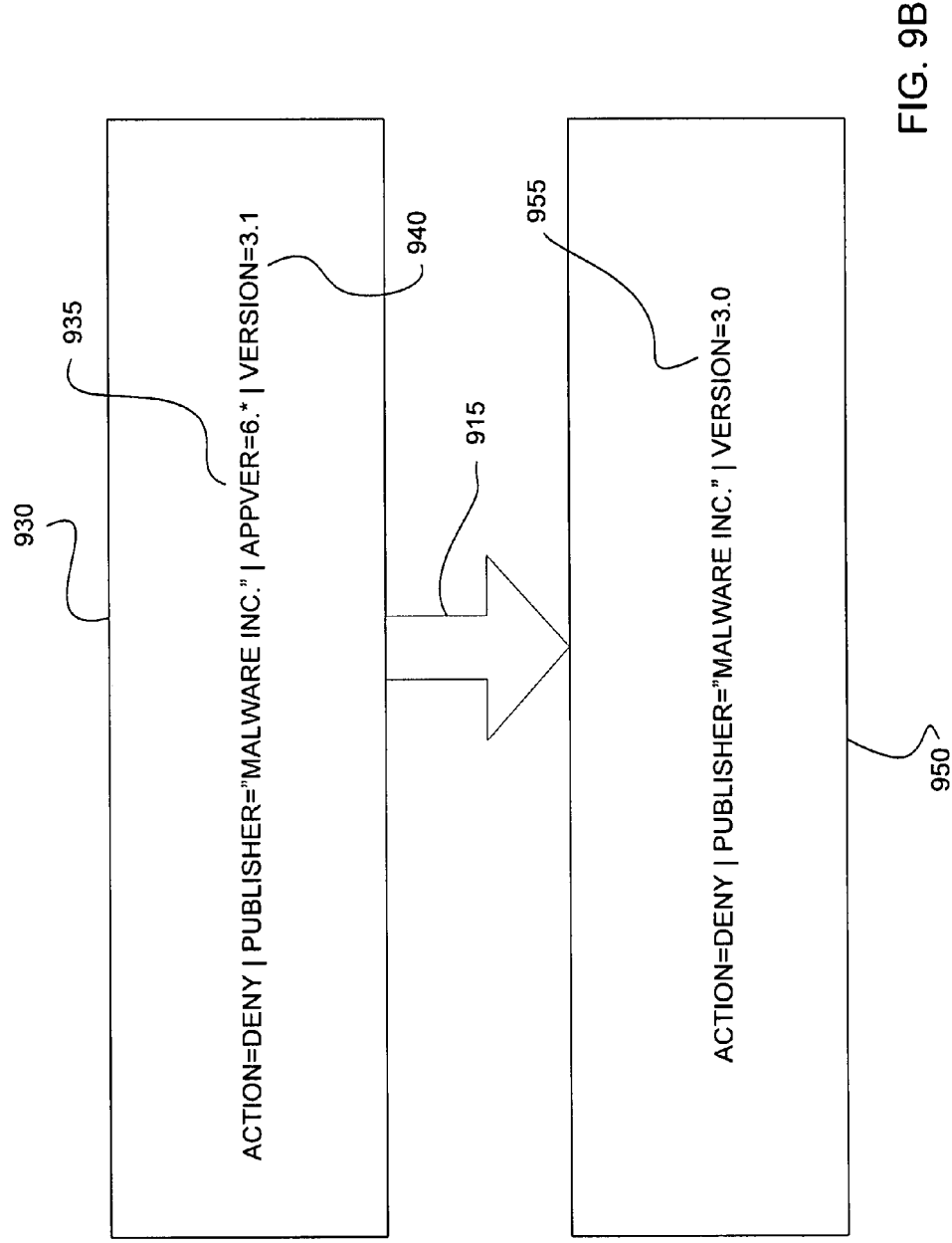

FIG. 9B depicts a second example of parameter stripping when the policy handle minor version is different than the policy minor version supported by the remote server 115. In FIG. 9B assume that a mgmt app 105 is attempting to enumerate, or read, from a remote server 115 the objects, or rules, of a policy that in the remote server's policy version contain object, or rule, 930 with an object version value 940 of 3.1. Also assume the policy handle version value, i.e., the policy version chosen by the client API 110 during software version negotiation, and the policy version supported by the mgmt app 105, has a value of 3.0. In this example the mgmt app's policy minor version value (0), and the resultant policy handle's minor version value (0), for object, or rule, 950 of FIG. 9B is less than the corresponding remote server's policy minor version value (1) for the corresponding object 930.

In the example of FIG. 9B object 930, version 940 of a value 3.1, has an additional, application version value, parameter 935 that does not exist, and is therefore not supported, in the corresponding object 950, version 955 of a value 3.0. Thus, in this example parameter stripping is required to strip, or otherwise delete, parameter 935 (APPVER=6.*) from object 930. As shown in the corresponding object, or rule, 950, all other parameters that exist in object 930 remain after parameter stripping.

In the example of FIG. 9B, assuming a mgmt app 105 is attempting to enumerate the policy objects from a remote server 115 wherein the mgmt app's minor policy version is smaller than the remote server's corresponding minor policy version, the remote server 115 performs the parameter stripping as necessary.

Figure 10:
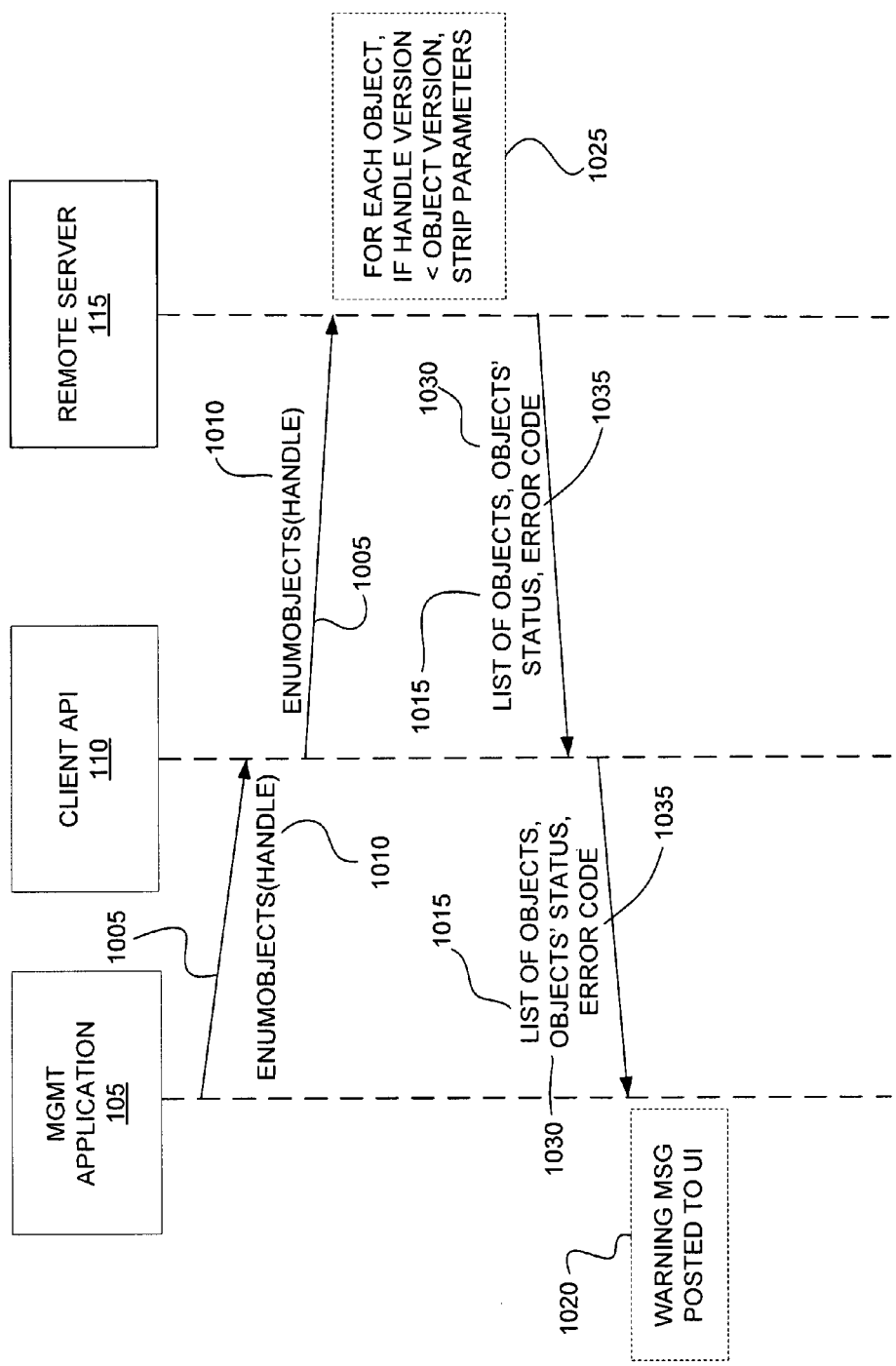
FIG. 10 depicts an embodiment process flow for parameter stripping when the negotiated software minor version is less than the software minor version supported by a remote server in a managed environment system.

FIG. 10 is an exemplary embodiment processing flow for an object command issued from a mgmt app 105 to a remote server 115. In the example of FIG. 10 the applicable policy minor version value supported by the mgmt app 105 is less than the minor version value of the corresponding policy supported by the remote server 115. In the example of FIG. 10 the issued object command requires the remote server 115 to send one or more objects to the mgmt app 105, e.g., an enum object command.

In the example and embodiment of FIG. 10 the mgmt app 105 sends an object command 1005 to the client API 110 for forwarding to a remote server 115. In this example command 1005 is an enum command with an ENUM OBJECTS call. In an embodiment command 1005 includes a handle parameter 1010 that identifies the policy and policy version for which the mgmt app 105 is issuing the enum command 1005.

In an embodiment, upon receiving the command 1005 from the mgmt app 105 the client API 110 forwards the command 1005 to the appropriate remote server 115 for processing.

In an embodiment, upon receiving the command 1005 the remote server 115 checks 1025 each object, or rule, of the identified policy responsive to the command 1005 to determine if the object version supported by the remote server 115 has a minor version value that is larger than the minor version value of the indicated policy handle parameter 1010. For any one such object, or rule, checked 1025, if the remote server's minor version value is larger than the policy handle minor version value, the remote server strips out, or otherwise deletes, 1025 any parameter, or parameters, in its object version that do not exist in the policy handle's version.

In an embodiment, after the remote server 115 has checked 1025 all the objects, or rules, of the identified policy responsive to the command 1005, the remote server 115 sends a list of the policy objects 1015 to the client API 110. In an embodiment the list of policy objects 1015 sent to the client API 110 identifies each object, or rule, in the policy.

In an embodiment the remote server 115 accompanies the list of policy objects 1015 sent to the client API 110 with each object's status 1030. In an embodiment an object's status 1030 indicates whether or not the object was modified, i.e., had parameter stripping performed on it, by the remote server 115.

In an embodiment the remote server 115 accompanies the list of policy objects 1015 sent to the client API 110 with an error code 1035. In an embodiment the error code 1035 indicates the status of the command processing, e.g., the command processed successfully, the command failed to be executed, etc.

In an embodiment, upon receiving the list of policy objects 1015 from the remote server 115 the client API 110 forwards the object list 1015 to the mgmt app 105. In an embodiment the client API 110 forwards with the object list 1015 to the mgmt app 105 each object's status 1030. In an embodiment the client API 110 forwards with the object list 1015 to the mgmt app 105 the error code 1035 received from the remote server 115.

In an alternative embodiment, after receiving the list of policy objects 1015 from the remote server 115 the client API 110 generates a new message, e.g., an identification of the policy objects in a new format, a message with additional and/or different information than that sent with the list of policy objects 1015 from the remote server 115 to the client API 110, etc., and passes the newly generated message to the mgmt app 105.

In an embodiment, after receiving the list of policy objects 1015 from the client API 110 the mgmt app 105 can, if warranted, provide a warning message to the user interface 1020 indicating that some portions of the remote server's policy version are partially ignored during implementation. In an embodiment the mgmt app 105 uses the received objects' status 1030 to determine if parameter stripping was performed on any objects and, if so, to compose and issue an appropriate warning message to the user interface 1020.

In an embodiment the mgmt app 105 can use the error code to also, or otherwise, compose and issue a warning message to the user interface that indicates the status of the command processing, i.e., a command processing status message. In an aspect of this embodiment the mgmt app only publishes a command processing status message if the command failed to process completely and/or correctly.

As previously noted, in an embodiment, if a mgmt app 105 maintains a policy that has a greater minor version value than the corresponding policy maintained by a remote server 115 and the mgmt app 105 issues an object command to the remote server 115 that includes the forwarding of one or more objects to the remote server 115, e.g., an add object command, then the client API 110 associated with the mgmt app 105 will check for, and as necessary, perform parameter stripping.

Figure 11:
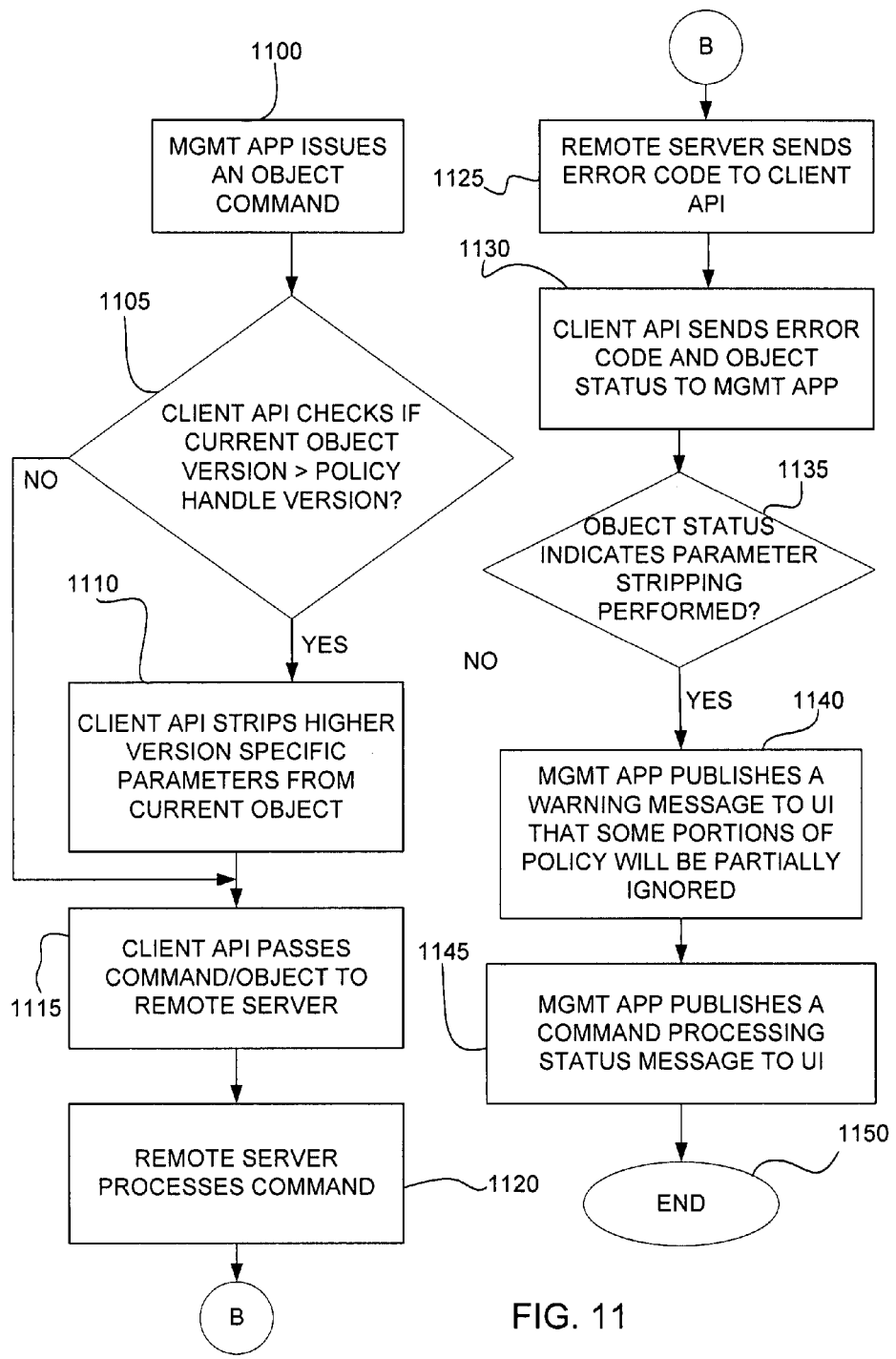
FIG. 11 illustrates an embodiment logic flow for parameter stripping an object command when the negotiated software minor version is less than the software minor version supported by a management application of a client issuing the command.

FIG. 11 illustrates an embodiment logic flow for a methodology for necessary parameter stripping when the policy minor version supported by a mgmt app 105 is of a larger value than the corresponding policy minor version supported by a remote server 115. While the following discussion is made with respect to systems portrayed herein, the operations described may be implemented in other systems. Further, the operations described herein are not limited to the order shown. Additionally, in other alternative embodiments more or fewer operations may be performed.

In an embodiment a mgmt app of a management console issues a command 1100 which is forwarded to the client API of the management console. In the logic flow of FIG. 11 the command issued by the mgmt app includes an object to be processed by a remote server, e.g., an add command which requests the remote server add a specified object to a policy, or a set command which requests the remote server set a parameter in a specified object to an indicated value. In an embodiment the command issued by the mgmt app 1100 includes the object to be operated on by the remote server and the object's version value.

In an embodiment the command issued by the mgmt app includes the policy handle associated with the passed object.

In an embodiment, upon receiving the command from the mgmt app, at decision block 1105 the client API checks if the passed object's minor version value is greater than the policy handle's minor version value. If yes, the client API strips from the object all those parameters that do not exist in the object of the corresponding policy handle's version 1110.

Whether or not parameter stripping is required, the client API thereafter forwards the command and object to the remote server for processing 1115. If the object had parameter stripping performed on it by the client API, the client API forwards the stripped version of the object to the remote server for processing 1115. The remote server then implements, or otherwise processes, the command 1120, and forwards an error code back to the client API 1125. In an embodiment the error code indicates the status of the command processing, e.g., command processed successfully, command failed to process, etc.

In an embodiment the client API forwards the received error code from the remote server to the mgmt app 1130. In an embodiment the client API forwards with the error code to the mgmt app a status of the object that was a parameter in the mgmt app's command 1130. In an embodiment the object's status indicates whether or not the object required parameter stripping.

In an embodiment at decision block 1135 the mgmt app makes a determination based on the object status whether parameter stripping was performed on the command object. If yes, the mgmt app composes and publishes a warning message to the user interface (UI) indicating that one or more parameters of the object supported by the mgmt app were not implemented because they were not supported by the applicable remote server 1140.

In an embodiment the mgmt app also, or otherwise, uses the received error code to compose and publish a message to the UI indicating the status of the command processing 1145, i.e., a command processing status message. In an aspect of this embodiment the mgmt app only publishes a command processing status message if the command failed to process completely and/or correctly.

Whether or not any warning message is published, thereafter the processing of the current mgmt app command is finalized 1150.

In an embodiment the mgmt app 105 can issue a command to a remote server 115 that includes more than one object parameter. In this embodiment, if any object version supported by the mgmt app 105 has a greater minor value than the respective object version supported by the remote server 115, the client API 110 of the management console 150 will check the respective object and perform parameter stripping on the object as necessary.

Figure 12:
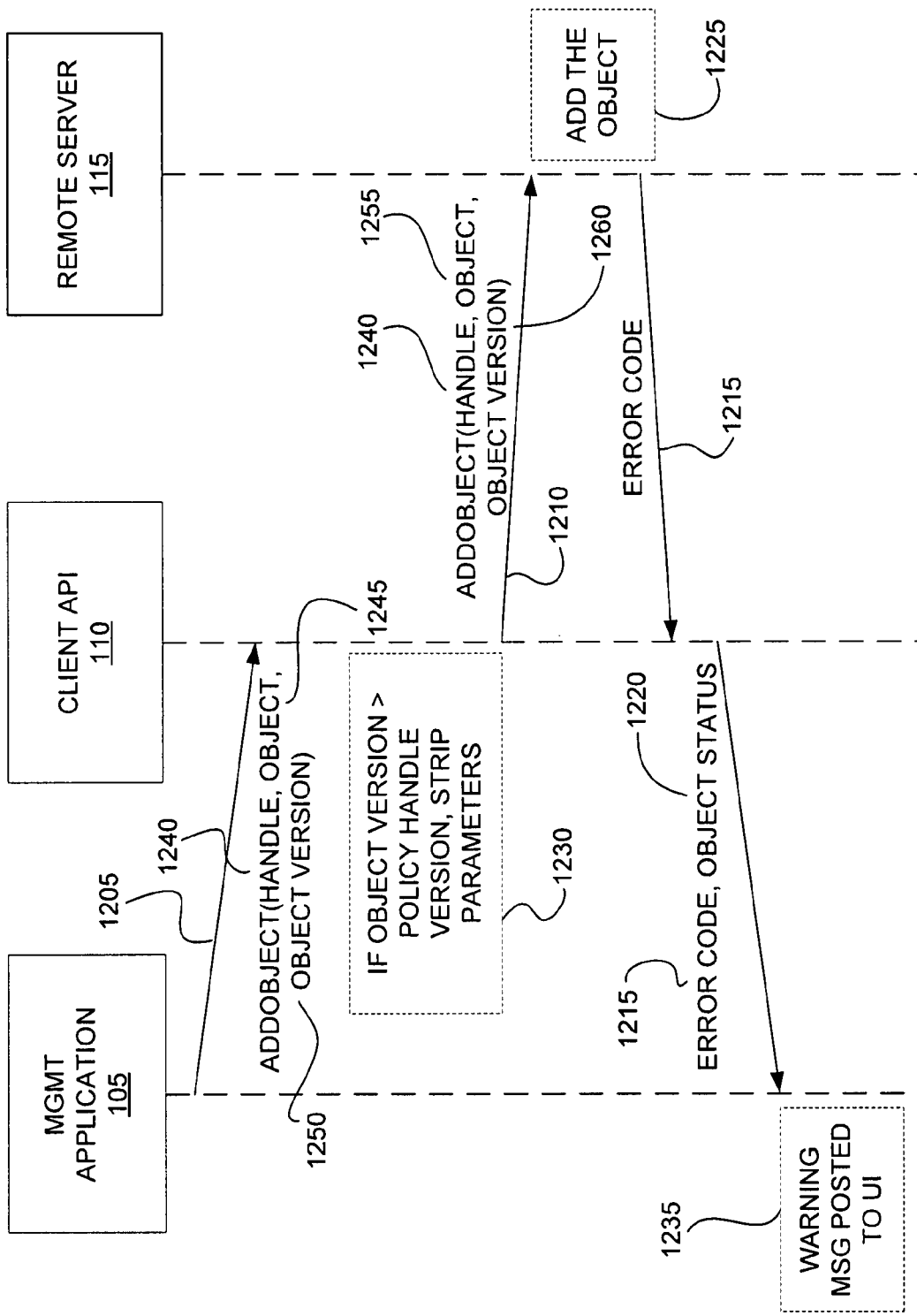
FIG. 12 depicts an embodiment process flow for parameter stripping when the negotiated software minor version is less than the software minor version supported by a management application of a client in a managed environment system.

FIG. 12 is an exemplary embodiment processing flow for a command issued from a mgmt app 105 to a remote server 115. In the example of FIG. 12 the applicable policy minor version value supported by the remote server 115 is less than the minor version value of the corresponding policy supported by the mgmt app 105. In the example of FIG. 12 the issued command includes one or more object parameters that the remote server 115 must utilize in processing the command, e.g., an add object command or a set object command.

In the example and embodiment of FIG. 12 the mgmt app 105 sends a command 1205 to the client API 110 for forwarding to a remote server 115. In this example command 1205 is an add object command with an ADDOBJECT call. In an embodiment command 1205 includes a policy handle parameter 1240 that identifies the negotiated policy and policy version for which the mgmt app 105 is issuing the add command 1205.

In an embodiment command 1205 includes one or more object parameters 1245 that are to be utilized in processing the command 1205. In an embodiment command 1205 includes an object version identification 1250 for each object parameter 1245.

In an embodiment, upon receiving the command 1205 from the mgmt app 105 the client API 110 checks 1230 to determine for each object parameter of the command whether the object minor version value is greater than the policy handle minor version value. For any object parameter checked 1230, if the object's minor version value is larger than the policy handle minor version value, the client API 110 strips out, or otherwise deletes, 1230 any parameter, or parameters, in the object passed by the mgmt app 105 in the command call 1205 that do not exist in the corresponding object in the policy handle's version.

In an embodiment, after the client API checks 1230 all the object parameters, it forwards the command 1210 to the remote server 115. In this example of FIG. 12 command 1210 is the add object command, i.e., is an ADDOBJECT call. In an embodiment command 1210 includes the policy handle parameter 1240 passed in the command call 1205 from the mgmt app 105 to the client API 110.

In an embodiment command 1210 includes one or more object parameters 1255 that are to be utilized in processing the command 1210. If any object parameter 1245 in the mgmt app command call 1205 had parameter stripping performed on it by the client API 110, the parameter stripped version of the object is included in the command call 1210 from the client API 110 to the remote server 115.

In an embodiment command 1210 includes an object version identification 1260 for each object parameter 1255. If an object parameter 1245 in the mgmt app command 1205 had parameter stripping performed on it by the client API 110, the respective object version parameter 1260 in the command 1210 reflects the stripped object version.

After receiving the command 1210 from the client API 110 the remote server 115 attempts to process the command 1225, e.g., add the specified object(s) indicated in the add object command to the policy. Thereafter, in an embodiment the remote server 115 forwards an error code 1215 to the client API 110. In an embodiment the error code 1215 indicates the status of the command processing, e.g., the command processed successfully, the command failed to be executed, etc.

In an embodiment, upon receiving the error code 1215 from the remote server 115, the client API 110 forwards the error code 1215 to the mgmt app 105. In an embodiment the client API 110 accompanies the error code 1215 sent to the mgmt app 105 with an object status 1220 for each object parameter in the mgmt app's command 1205. In an embodiment an object's status 1220 indicates whether or not the object was modified, i.e., had parameter stripping performed on it, by the client API 110.

In an embodiment the mgmt app 105 uses the received objects' status 1220 to determine if parameter stripping was performed on any object and, if so, to compose and issue an appropriate warning message to the user interface 1235.

In an embodiment the mgmt app 105 can use the error code 1215 to also, or otherwise, compose and issue a warning message to the user interface that indicates the status of the command processing, i.e., a command processing status message. In an aspect of this embodiment the mgmt app 105 only publishes a command processing status message if the command failed to process completely and/or correctly.

Figure 13A:
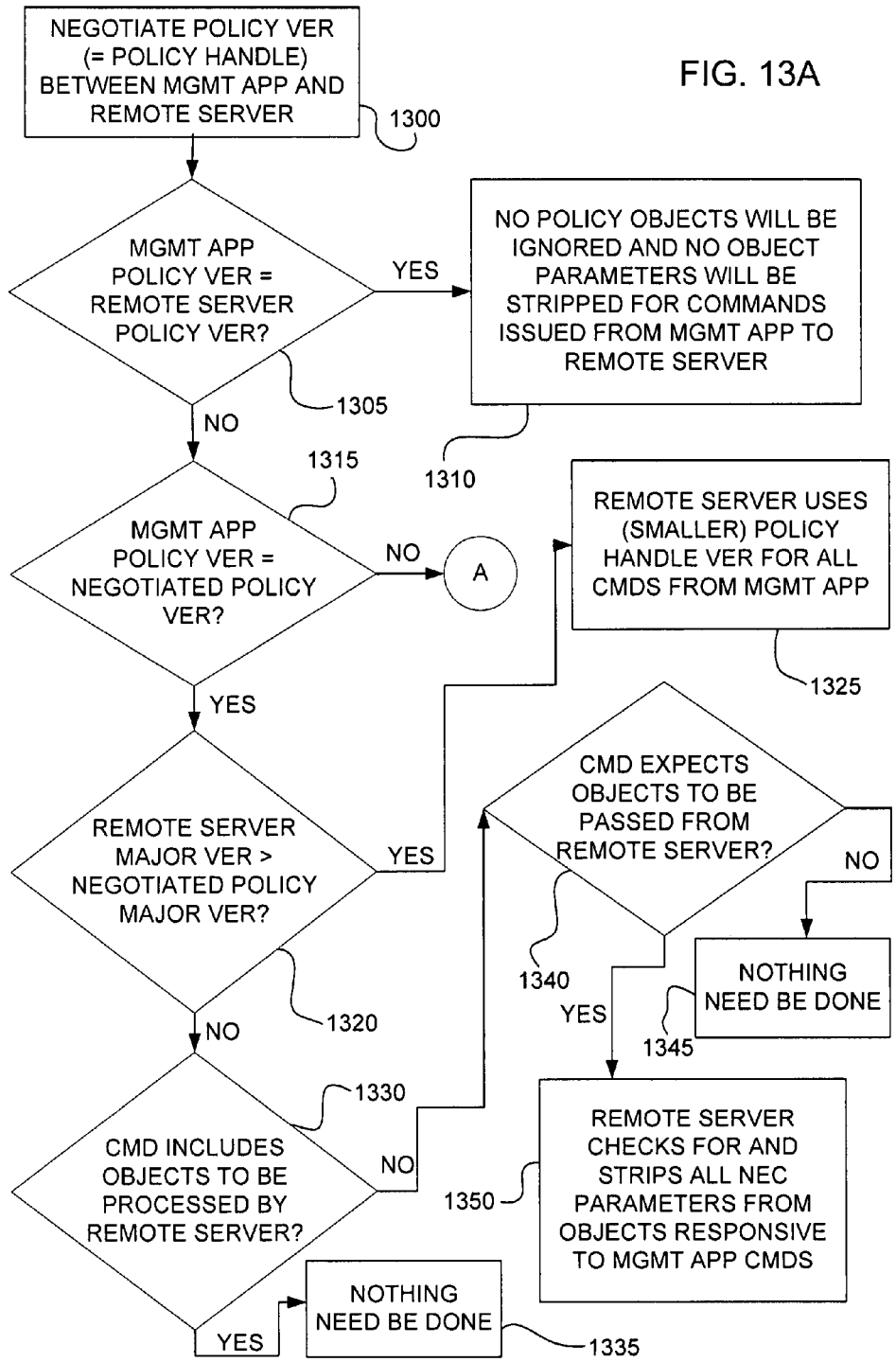
FIGS. 13A and 13B illustrate an embodiment logic flow for a methodology for implementing policy version negotiation and/or parameter stripping in a managed environment system.
Figure 13B:
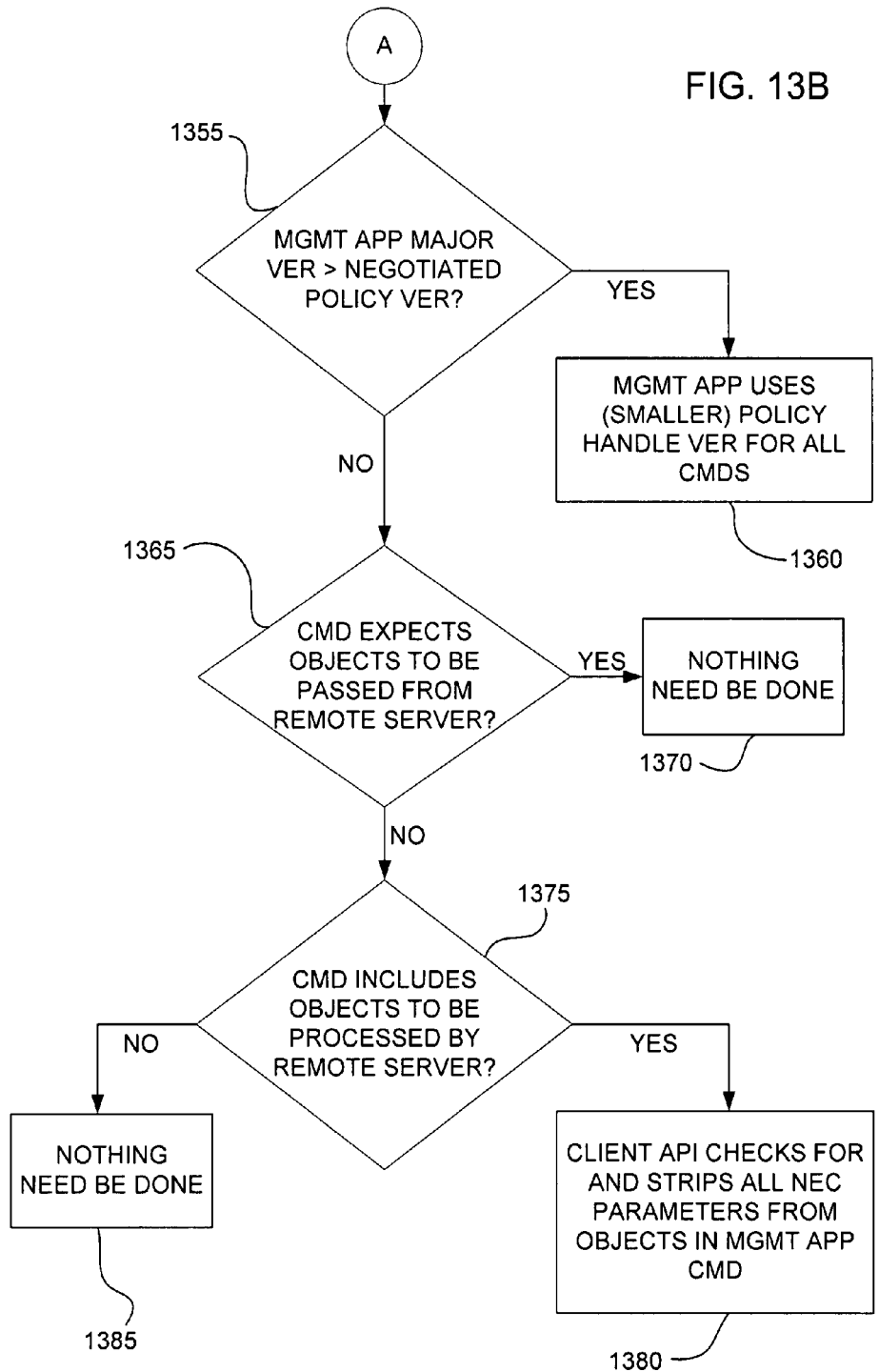

FIGS. 13A and 13B illustrate an embodiment logic flow for a methodology for implementing policy version negotiation and/or parameter stripping in a managed environment system 100. While the following discussion is made with respect to systems portrayed herein, the operations described may be implemented in other systems. Further, the operations described herein are not limited to the order shown. Additionally, in other alternative embodiments more or fewer operations may be performed.

In an embodiment a mgmt app of a management console and a remote server will negotiate a policy version to be used 1300. In an embodiment the version with the lowest major version value is negotiated to be used, and thereafter deemed the policy handle 1300. An embodiment methodology for software, or policy, version negotiation is shown in FIG. 2 and FIG. 4.

At decision block 1305 a determination is made as to whether the policy version supported by the mgmt app has the same major/minor version value x.y as the policy version supported by the remote server. If the mgmt app and the remote server do support the identical policy major/minor version x.y, then when commands are issued from the mgmt app for this policy no policy objects will be ignored and no object parameters will be stripped to process the command 1310.

If, however, the mgmt app and the remote server do not support the same policy major/minor version, then at decision block 1315 a determination is made as to whether the policy version supported by the mgmt app is the same as the negotiated policy handle's version 1315. If yes, the mgmt app policy version value is less than the remote server's corresponding policy version value and the negotiated policy version is the mgmt app's policy version.

If the mgmt app's policy version is the negotiated policy version, i.e., policy handle, then at decision block 1320 a determination is made as to whether the remote server's policy major version value x is greater than the negotiated policy major version value x. If yes, the remote server will use the smaller, negotiated, major/minor policy version in processing all the mgmt app commands for the policy 1325.

If the remote server's policy major version value is not greater than the negotiated policy major version value the remote server's policy minor version value y is greater than the negotiated policy minor version value y. In this case parameter stripping may be required.

At decision block 1330 a determination is made as to whether the current issued mgmt app command includes one or more objects to be processed by the remote server. Thus, at decision block 1330 a determination is made as to whether the current command issued by the mgmt app to the remote server includes one or more object parameters. If yes, nothing need be done 1335 because the mgmt app is using a smaller policy version than the remote server, and all parameters known in the smaller policy version are known in the larger, remote server's, policy version. Thus, in this case parameter stripping is not required.

If, however, at decision block 1330 a determination is made that the current mgmt app command does not include one or more object parameters, at decision block 1340 a determination is made as to whether the current mgmt app command expects one or more objects to be passed from the remote server in response. If no, nothing need be done, i.e., parameter stripping is not required, 1345 as there is no response expected from the remote server that will include any objects that the mgmt app's policy version will not recognize.

If, however, at decision block 1340 a determination is made that the current mgmt app command expects one or more objects to be passed from the remote server in response, the remote server will check for and strip all necessary parameters from the objects that are responsive to the mgmt app's command 1350. An embodiment methodology for parameter stripping in this instance is shown in FIGS. 7A and 7B.

Referring back to decision block 1315, if a determination is made that the mgmt app policy version is not the negotiated policy version, then the mgmt app's policy version value is greater than the remote server's and negotiated policy's version value. In this case, and referring to FIG. 13B, at decision block 1355 a determination is made as to whether the mgmt app's policy major version value x is greater than the negotiated policy major version value x. If yes, the mgmt app will use the smaller, negotiated, major/minor policy version in processing all the mgmt app commands for the policy 1360.

If the mgmt app's policy major version value is not greater than the negotiated policy major version value the mgmt app's policy minor version value y is greater than the negotiated policy minor version value y. In this case parameter stripping may be required.

At decision block 1365 a determination is made as to whether the current mgmt app command expects one or more objects to be passed from the remote server in response. If yes, nothing need be done, i.e., parameter stripping is not required, 1370 as there is no response expected from the remote server that will include any objects that the mgmt app's policy version will not recognize.

If, however, at decision block 1365 a determination is made that the current mgmt app command does not expect one or more objects to be passed from the remote server in response, then at decision block 1375 a determination is made as to whether the current mgmt app command includes one or more object parameters to be processed by the remote server. If no, nothing need be done, i.e., parameter stripping is not required, 1385 as the mgmt app is not passing any objects to the remote server that the remote server's policy version will not recognize.

At decision block 1375 if a determination is made that the current mgmt app command does include one or more objects to be processed by the remote server the client API associated with the mgmt app will check for and strip all necessary parameters from the objects 1380. Checking for, and stripping as necessary, parameters in the passed objects of the mgmit app command is necessary in this instance for those object parameters that do not exist in the remote server's smaller policy version. An embodiment methodology for parameter stripping in these circumstances is shown in FIG. 11.

In an embodiment a mgmt app of a particular version can be implemented on an older system in which the respective client API 110 is of a smaller version, i.e., the client API 110 version is older, or less than, the current version of the mgmt app 105 of the management console 150. In this embodiment a remote server 115 interfacing with the respective management console 150 supports a different version than the mgmt app 105 or the client API 110. In this embodiment situation the client API 110 negotiates, or otherwise chooses, the smallest version between the mgmt app 105's version, the client API 110's version and the remote server 115's version to be the version implemented between these three.

Multi-Version Policy Implemenation

In some situations it can be advantageous to deploy more than one version of a policy to support managing group policy objects ("GPO"). In circumstances where various clients in a managed environment system 100 support various versions, it is advantageous to deploy policy versions to these clients that are each compatible with the respective client-supported major version, i.e., perform policy schema translation. Moreover, in combination with policy schema translation, it is advantageous to use parameter stripping to handle differences in minor policy versions.

In an embodiment, using policy schema translation to generate policy versions for deployment to various clients in a managed environment system 100 allows for a single policy containing new features to be authored using the latest version of the host management console, or client. The new policy version is translated to policy versions that can be implemented on other clients in the managed environment system 100. In this manner, no more than one policy version need be authored to support the implementation of the policy with various alternative client versions and/or client platform versions.

Figure 14:
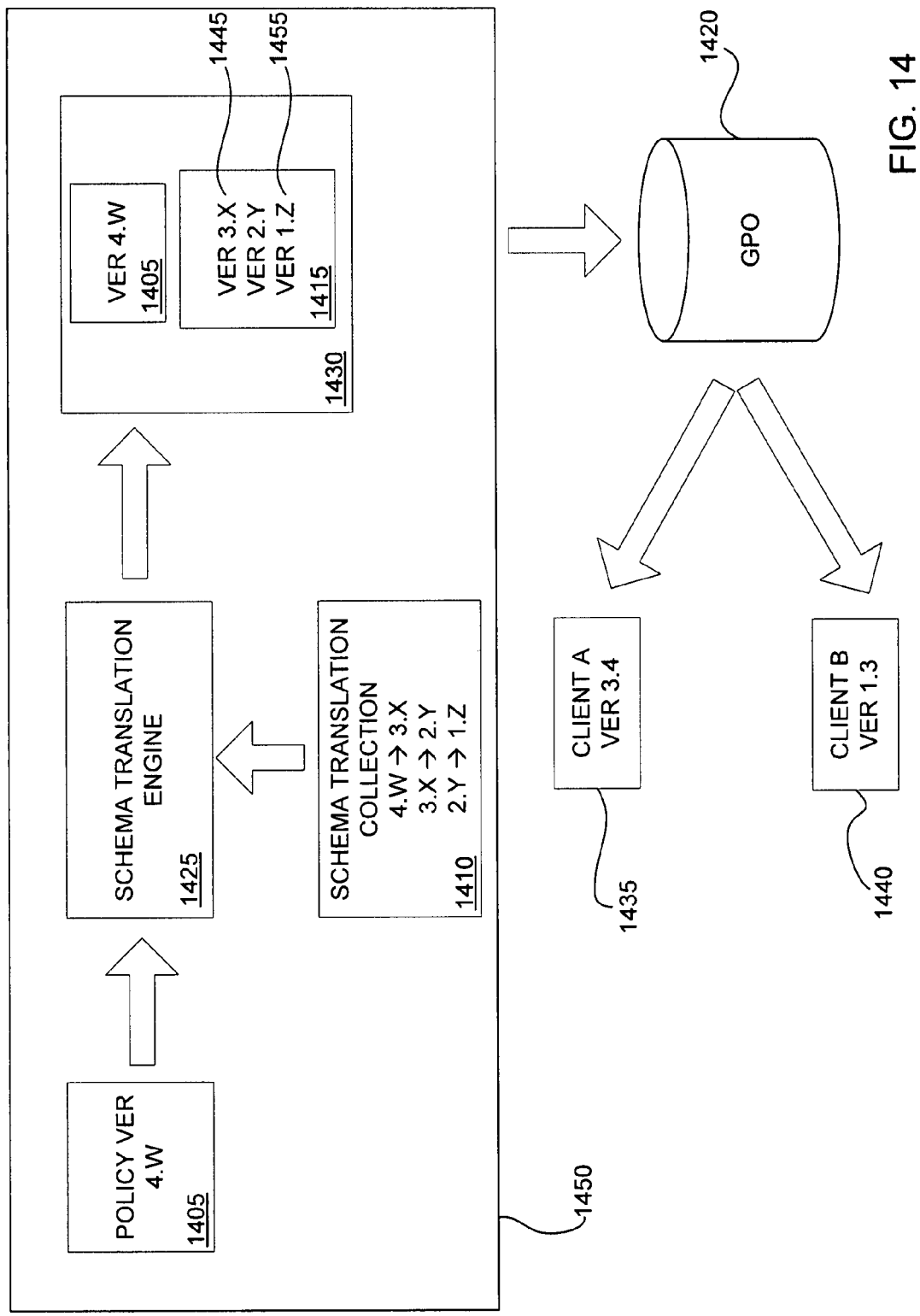
FIG. 14 illustrates an embodiment policy schema translation, or policy conversion.

Referring to FIG. 14, in an embodiment a schema translation engine 1425 is used to translate a new policy version 1405 into P different versions 1415. In an embodiment P represents one (1) less than the major version number of the policy 1405 native to the schema translation engine 1425. For example, if a policy 1405 to be deployed has a version value of 4.w, in an embodiment the respective schema translation engine 1425 will translate the policy into three (3) versions 1415 as three (3) is one (1) less than the major version value four (4) of the policy 1405.

Thus, if the new policy version 1405 to be translated has a value of 4.w, in an embodiment the schema translation engine 1425 will generate a version 3.x, a version 2.y and a version 1.z of the policy.

In an embodiment each P translated minor version represents the highest, or largest, minor version for each P major version. Thus, for example, if eight (8) is the largest known minor version for major version three (3), then in an embodiment the new policy 1405 version 4.w will be translated into version 3.8.

In an alternate embodiment each P translated minor version represents a known minor version corresponding to the P major version value. As an example, in this alternate embodiment new policy 1405 version 4.w may be translated into version 3.6 even though version 3.8 is the largest existing version with a major version value of three (3).

In another alternate embodiment policy schema translation is performed on a policy with a new major version value to produce Q number of translated versions where Q is less than the value of the new policy's major version minus one (1). As an example, in this alternate embodiment new policy 1405 version 4.w may be translated into only two (2) versions, 3.x and 2.y.

In an embodiment the schema translation engine 1425 is run by the client API 110 of the management console 150 implementing the new major policy version 1405. In an embodiment policy schema translation is performed at policy deployment time.

In an embodiment a schema translation engine 1425 interprets a translation collection 1410 to generate the one or more translated policy versions 1415. In an embodiment the translation collection 1410 can be dynamically updated to provide the most efficient and secure output policy for a managed environment system 100.

In an embodiment in some circumstances the translation engine 1425 may translate a single rule of a new policy version 1405 to multiple rules in an older, or earlier, policy version in order to achieve the desired version result.

In an embodiment, and referring to the example of FIG. 14, to deploy a new major policy version to various clients, or management consoles, of a managed environment system 100, the schema translation engine 1425 hosted on management console 1450 supporting the new policy version 1405 interprets a translation collection 1410 to translate the policy 1405 version 4.w to version 3.x, which represents the highest existing minor version x for major version three (3). In this embodiment example the schema translation engine 1425 interprets the translation collection 1410 to translate the policy version 3.x to version 2.y, which represents the highest existing minor version y for major version two (2). In this embodiment example the schema translation engine 1425 interprets the translation collection 1410 to translate the policy version 2.y to version 1.z, which represents the highest existing minor version z for major version one (1).

In an embodiment the new policy 1405 version 4.w and all the translated policy versions 1415, 3.x, 2.y and 1.z, are collectively the output policies 1430 that can be deployed to various clients, or management consoles, in the managed environment system 100. In an embodiment the output policies 1430 are forwarded to a GPO 1420 (group policy object) of the managed environment system 100.

In an embodiment the new policy 1405 version 4.w is forwarded to the GPO 1420 at the time of deployment, and thereafter each translated version 1415, 3.x, 2.y and 1.z, is forwarded to the GPO 1420 as the respective translation is established. In an alternate embodiment once all necessary policy schema translations are finalized, all output policy versions 1430 are then forwarded to the GPO 1420. In this alternate embodiment and the example of FIG. 14, new policy 1405 version 4.x and translated policy versions 1415, 3.x, 2.y and 1.z, are forwarded to the GPO 1420 when all the translated versions 1415 are generated.

In an embodiment, from the GPO 1420 each output policy 1430 is forwarded to the client, or management console 150, to which the policy is to be deployed and which supports the respective major version value. Referring to the example of FIG. 14, translated policy version 3.x 1445 is forwarded to client A 1435 as client A 1435 supports major version three (3). In this example translated policy version 1.z 1455 is forwarded to client B 1440 as client B 1440 supports major version one (1).

In the example of FIG. 14 client A 1435 and client B 1440 may thereafter have to perform parameter stripping when implementing the new policy, version 3.x 1445 and version 1.z 1455 respectively, or any portion thereof, to delete, or otherwise strip out or ignore, those parameters existing in the policy version that is deployed to them that are not supported by their client version.

For example, assume the schema translation engine 1425 translated policy 1405 version 4.w to version 3.8, which is thereafter forwarded to client A 1435. Also assume that client A's version is 3.4. In this case the policy version 3.8 deployed to client A 1435 has a larger minor version value (8) than the minor version value (4) of client A 1435. Parameter stripping may therefore be necessary when client A 1435 implements the policy, to delete or otherwise strip out or ignore, those parameters that exist in policy version 3.8 that are not supported in client A's version 3.4.

Figure 15:
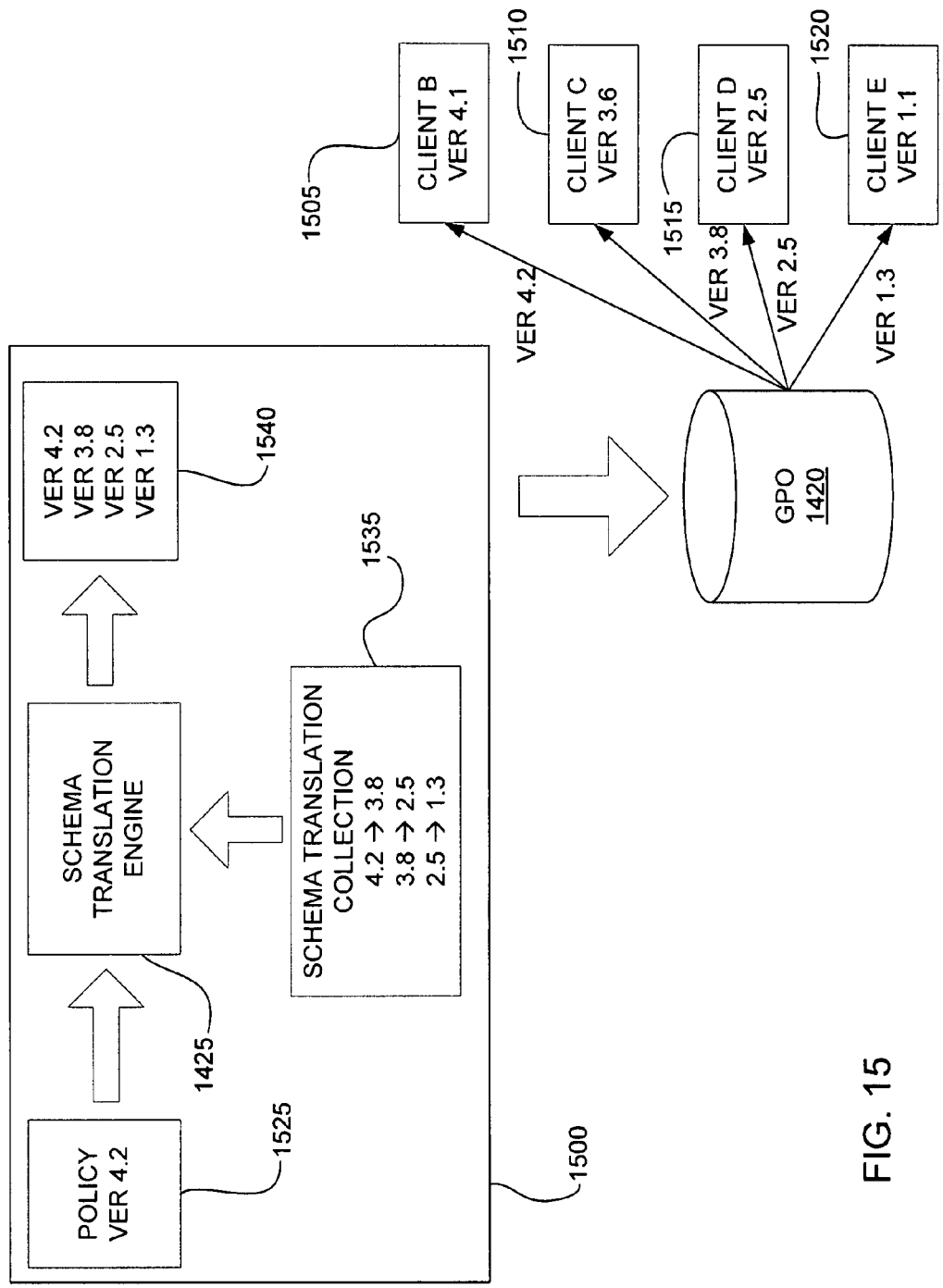
FIG. 15 depicts an example of an embodiment policy schema translation, or policy conversion.

FIG. 15 is an example of policy schema translation wherein new IPsec encryption features are incorporated into a set of rules in a new firewall policy 1525 version 4.2 on a management console, or client, 1500. In this example the new IPsec encryption features caused a major schema revision, i.e., the latest firewall policy 1525 major version value was increased, or incremented, by one, e.g., from three (3) to four (4). As in our example, the most currently released policy version may also reflect minor changes, and thus, its minor version value may not be zero (0).

In the example of FIG. 15 various other clients in the managed environment system 100 support other, lesser, versions than the client 1500. In this example, client B 1505 supports version 4.1, client C 1510 supports version 3.6, client D 1515 supports version 2.5 and client E 1520 supports version 1.1.

In an embodiment, to deploy the firewall policy 1525 to the various clients B 1505, C 1510, D 1515 and E 1520, the schema translation engine 1425 hosted on management console, or client, A 1500 interprets a translation collection 1535 to translate the firewall policy 1525 version 4.2 to version 3.8, which in this example represents the highest existing minor version (8) for major version three (3). The schema translation engine 1425 interprets the translation collection 1535 to translate the firewall policy version 3.8 to version 2.5, which in this example represents the highest existing minor version (5) for major version two (2). The schema translation engine 1425 interprets the translation collection 1535 to translate the firewall policy version 2.5 to version 1.3, which in this example represents the highest existing minor version (3) for major version one (1).

In this embodiment example the new firewall policy 1525 version 4.2 and all the translated firewall policy versions, 3.8, 2.5 and 1.3, collectively the output policies 1540, are forwarded to a GPO 1420 of the managed environment system 100. In an embodiment, from the GPO 1420 each output policy 1540 is forwarded to the client to which the firewall policy is to be deployed and which supports the respective major version value. In the example of FIG. 15, new firewall policy version 4.2 is forwarded to client B 1505 as client B 1505 supports major version four (4). Translated firewall policy version 3.8 is forwarded to client C 1510 as client C 1510 supports major version three (3). Translated firewall policy version 2.5 is forwarded to client D 1515 and translated firewall policy version 1.3 is forwarded to client E 1520 as client D 1515 supports major version two (2) and client E 1520 supports major version one (1).

In the example of FIG. 15 client B 1505 supports version 4.1, yet it has been forwarded new firewall policy 1525 version 4.2. In this case parameter stripping may be necessary when the firewall policy, or any portion thereof, is implemented, to delete those parameters existing in new firewall policy 1525 version 4.2 that are not supported by client B's version 4.1. Likewise, client C 1510 supports version 3.6, yet it has been forwarded translated policy version 3.8. Parameter stripping may be necessary in this case when the firewall policy, or any portion thereof, is implemented, to delete those parameters existing in translated firewall policy version 3.8 that are not supported by client C's version 3.6. Similarly, client E 1520 supports version 1.1, yet it has been forwarded translated firewall policy version 1.3. Parameter stripping may be required in this situation when the firewall policy, or any portion thereof, is implemented, to delete those parameters existing in translated firewall policy version 1.3 that are not supported by client E's version 1.1.

In the example of FIG. 15 translated policy version 2.5 has been forwarded to client D 1515 and client D 1515 supports version 2.5. In this case no parameter stripping will be necessary as client D 1515 supports the same version as the translated firewall policy it has been forwarded from the GPO 1420.

In some circumstances the translation collection may not support a translation from one major minor policy version to another. In an embodiment in these situations, parameter stripping is used to generate a minor version of a major policy version that is supported by the translation collection for policy schema translation.

Figure 16:
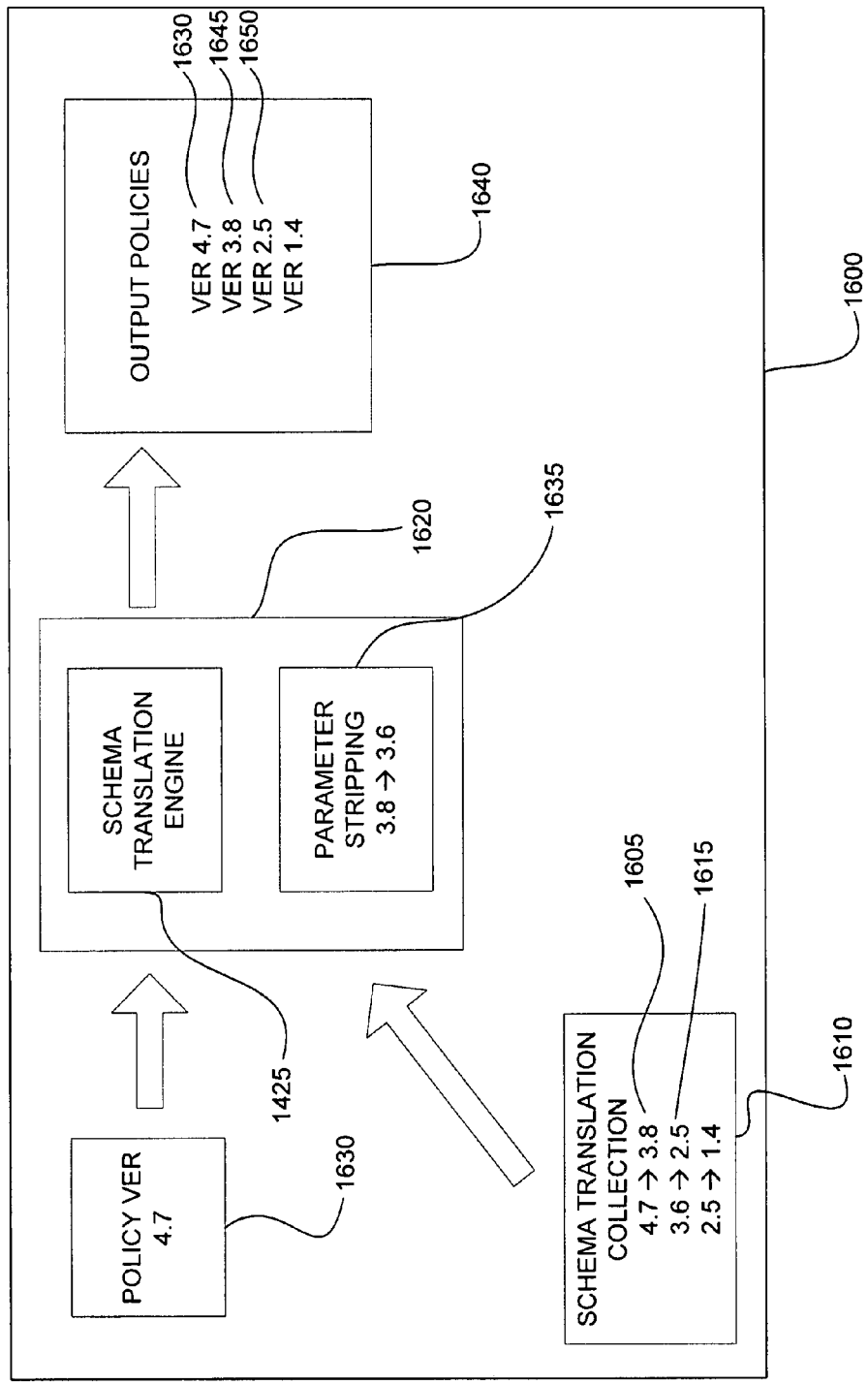
FIG. 16 depicts an example of an embodiment policy schema translation involving intermediate parameter stripping.

Referring to the example of FIG. 16, policy schema translation is to be performed for new policy version 4.7 1630 hosted on management console, or client, 1600. The translation collection 1610 supports a translation 1605 from policy version 4.7 to version 3.8. The translation collection 1610 also supports a translation 1615 from policy version 3.6 to version 2.5. In this example the translation collection 1610 fails to support a translation from policy version 3.8 to version 2.5.

Thus, in this embodiment example the schema translation engine 1425 will interpret the translation collection 1610 to translate 1605 policy version 4.7 to policy version 3.8. The client API 1620 of the respective management console 1600 will then parameter strip as necessary to, in effect, generate 1635 a policy version 3.6 from translated version 3.8. Thereafter, the schema translation engine 1425 can interpret the translation collection 1610 to translate 1615 policy version 3.6 to policy version 2.5. The resultant output polices 1640 will consist of policy version 4.7 1630, policy version 3.8 1645 and policy version 2.5 1650.

In an embodiment therefore, a combination of policy schema translation and parameter stripping, performed in the order as necessary, can be utilized to create various translated policy versions from one new policy version.

Figure 17:
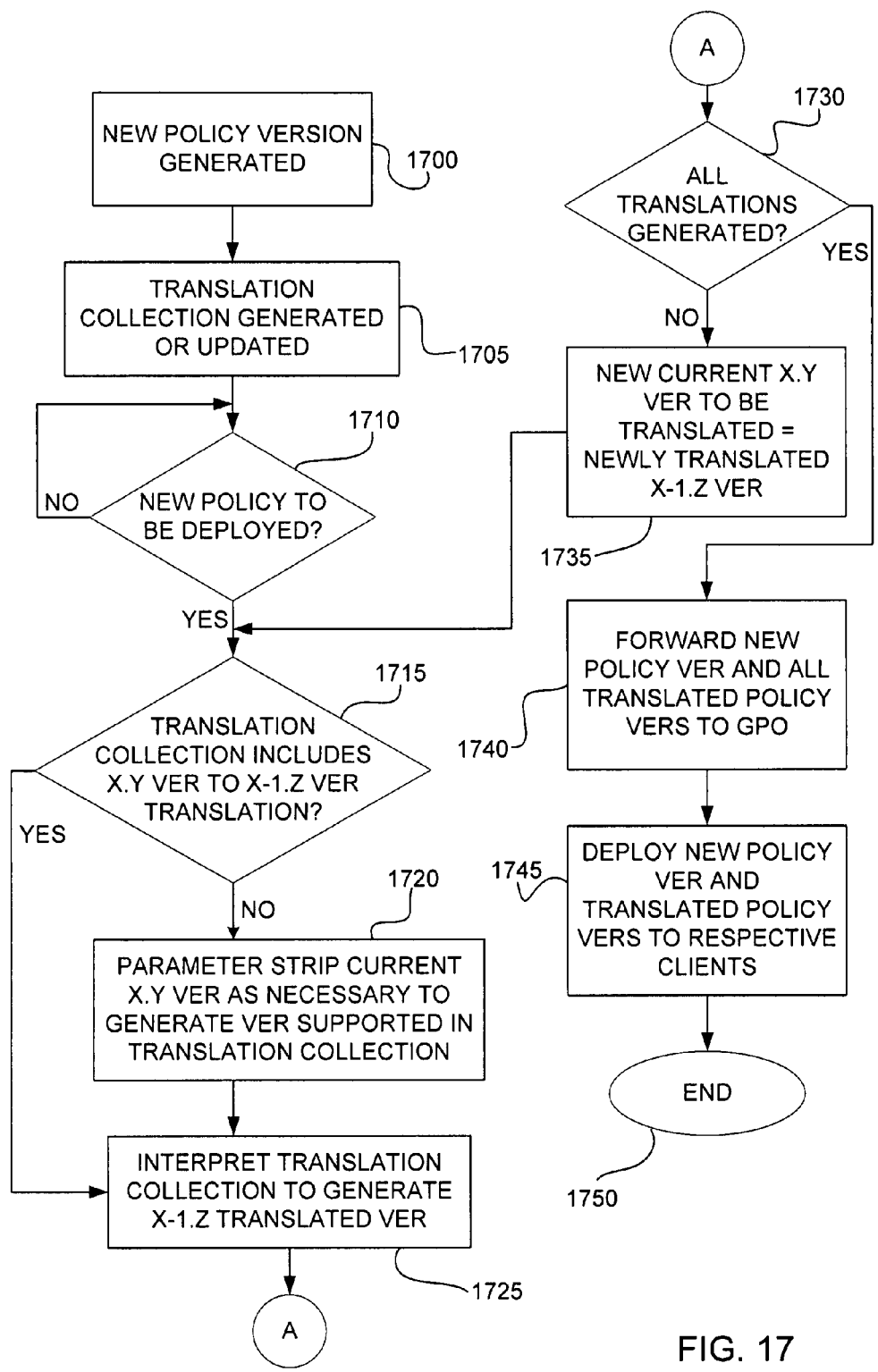
FIG. 17 illustrates an embodiment logic flow for a methodology for policy schema translation, or policy conversion.

FIG. 17 illustrates an embodiment logic flow for a methodology for policy schema translation in a managed environment system 100. While the following discussion is made with respect to systems portrayed herein, the operations described may be implemented in other systems. Further, the operations described herein are not limited to the order shown. Additionally, in other alternative embodiments more or fewer operations may be performed.

Referring to FIG. 17, in an embodiment a new policy version is generated, or otherwise created, and hosted on a management console of a managed environment system 1700. In an embodiment a translation collection is generated or updated to provide the necessary translation information to translate between two or more versions of the policy 1705. At decision block 1710 a determination is made as to whether the new policy version is to be deployed. If no, no further action is necessary until the new policy version is to be deployed.

If, however, at decision block 1710 the determination is made that the new policy version is to be deployed, at decision block 1715 a determination is made as to whether the translation collection includes translation information to translate current policy version x.y to policy version x-1.z. Thus, at decision block 1715 a determination is made as to whether the translation collection supports translating a current policy version to a policy version whose major version value is one less than the current policy version major value. If no, parameter stripping is used on the current policy version as necessary to generate a current policy version that can, with the translation collection, be translated to a new, lower major, policy version 1720.

Whether or not parameter stripping has been employed on the current policy version x.y, the management console hosting the current policy version x.y interprets the translation collection to generate policy version x-1.z 1725.

At decision block 1730 a determination is made as to whether or not all policy translations have been generated, or otherwise effected. If no, the translated policy version x-1.z becomes the new current policy version x.y 1735 and the logic returns to decision block 1715 to determine if the translation collection supports translating the new current policy version x.y to a policy version whose major version value is one less (x-1) than the current policy major version value x.

If at decision block 1730 a determination is made that all policy translations have been generated, the respective management console forwards the new policy version and all translated policy versions to a GPO of the managed environment system 1740. The GPO thereafter deploys the current policy version and/or one or more translated policy versions, as needed, to one or more clients in the managed environment system 1745. The policy schema translation for the current new policy version is then ended 1750. The embodiment logic of FIGS. 7A and 7B or the embodiment logic of FIG. 11 can thereafter be used for processing object commands of the newly deployed policy version.

In an embodiment the methodology of FIG. 17 can be used by a client API 110 to deploy an appropriate translated policy version to a remote server 115 in order that policy commands issued by a mgmt app 105 will be, if not fully, at least partially, implemented by the remote server 115. In an embodiment the client API 110 will interpret the translation collection to create translated policy versions until it generates a translated policy version whose major version value is compatible with the remote server 115. In this embodiment the client API 110 will then deploy, or otherwise forward, the compatible translated policy version to the remote server 115.

Figure 18:
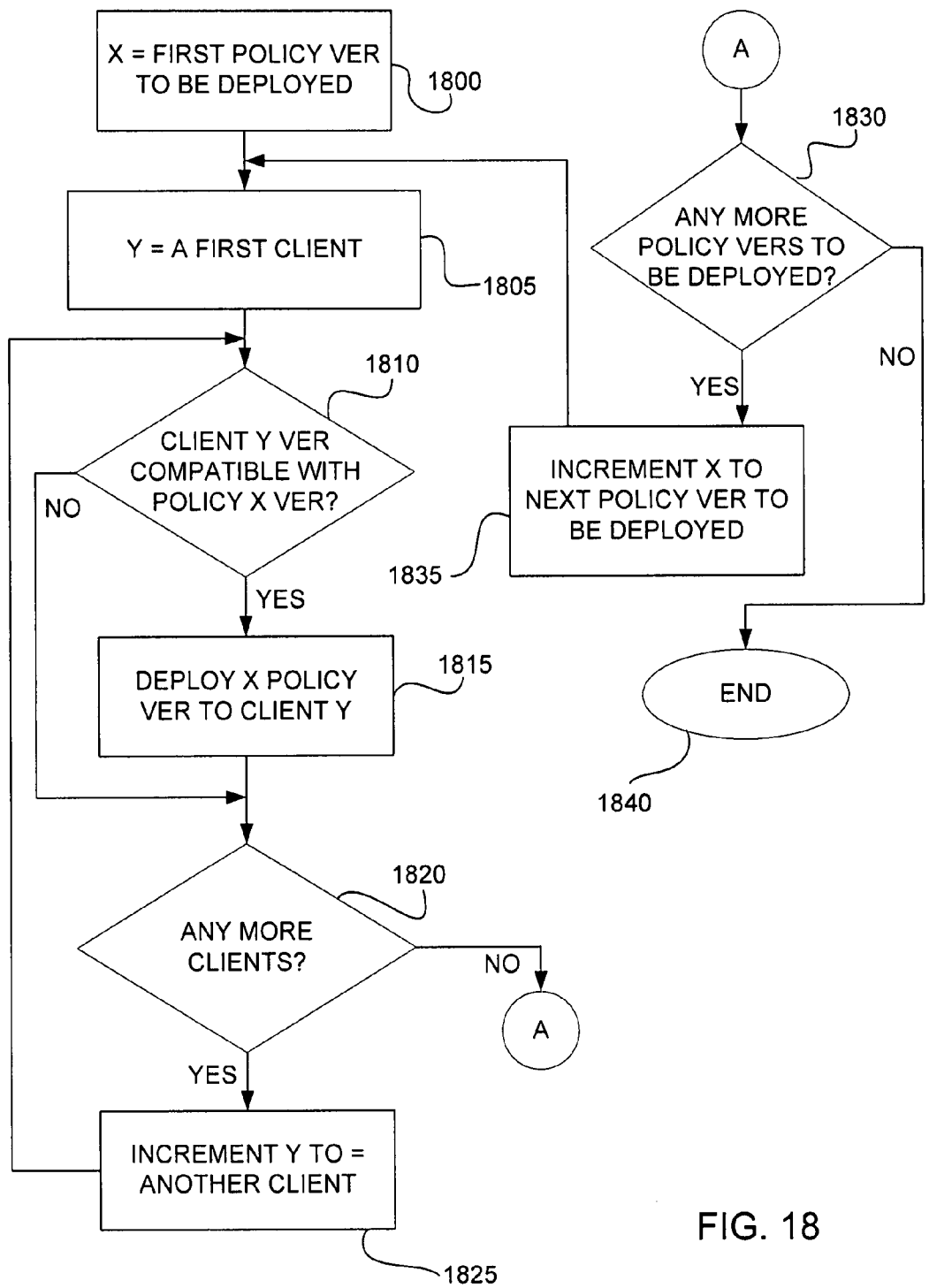
FIG. 18 illustrates an embodiment logic flow for a methodology for deploying one or more policy versions to one or more clients in a managed environment system.

FIG. 18 illustrates an embodiment logic flow for a methodology for policy deployment, box 1745 of FIG. 17, in a managed environment system 100. While the following discussion is made with respect to systems portrayed herein, the operations described may be implemented in other systems. Further, the operations described herein are not limited to the order shown. Additionally, in other alternative embodiments more or fewer operations may be performed.

For an embodiment policy deployment to one or more clients in a managed environment system, a first policy version x is identified 1800. A first client y in the managed environment system is also identified 1805. At decision block 1810 a determination is made as to whether client y's version is compatible with policy version x; in other words, does policy version x's major version value equal client y's major version value? If yes, policy version x is deployed, or otherwise sent or made available, to client y 1815 and client y 1815 accepts deployed policy version x.

Whether or not client y's version is compatible with policy version x, at decision block 1820 a determination is made as to whether or not there are any more clients in the managed environment system. If yes, y is incremented to a new client 1825 and the logic returns to decision block 1810 where a determination is made as to whether new client y's version is compatible with policy version x.

If at decision block 1820 it is determined that there are no more clients in the managed environment system then at decision block 1830 a determination is made as to whether there is another policy version to be deployed. If yes, x is incremented to a new policy version to be deployed 1835, a first client y is identified 1805, and the logic returns to decision block 1810 to determine whether client y's version is compatible with policy version x.

Once all the policy versions to be deployed have been deployed to one or more clients in the managed environment system the current policy deployment is ended 1840. Such policy versioning is efficient in that one policy version is used to generate one or more translated policy versions that are deployed to various clients in a managed environment system. Such policy versioning is secure as the policy versions that are deployed and subsequently enforced by various clients are as secure as the version supported by each respective client.

Version Targeting

In an embodiment the default is to deploy a policy to all clients in a managed environment system 100 using schema policy translation and parameter stripping as necessary. There are scenarios, however, where a system administrator may wish to deploy a policy to only one or more specific client, or platform, versions, i.e., effect version targeting. Such scenarios include, but are not limited to, a desire to protect against a platform-specific vulnerability and a desire to enable network access for an application on one or more specific platforms.

In an embodiment each client in a managed environment system has an associated version and each client platform in the managed environment system has an associated version. In an embodiment the management user interface of a client, or management console 150, exposes specific platforms hosted in the managed environment system 100 and their associated policy versions at policy deployment time.

In an embodiment version targeting uses both schema policy translation and parameter stripping, as needed, on a respective management console 150 supporting a new policy version to be deployed prior to policy deployment to ensure that the policy is configured, or otherwise translated, for the specific version(s) of the target client(s) and/or platform(s). In an embodiment a targeting parameter is used when deploying the new and translated policy versions to ensure that no policy version is accepted or, alternately, used by clients or platforms of non-targeted versions that may support a deployed policy version.

Figure 19:
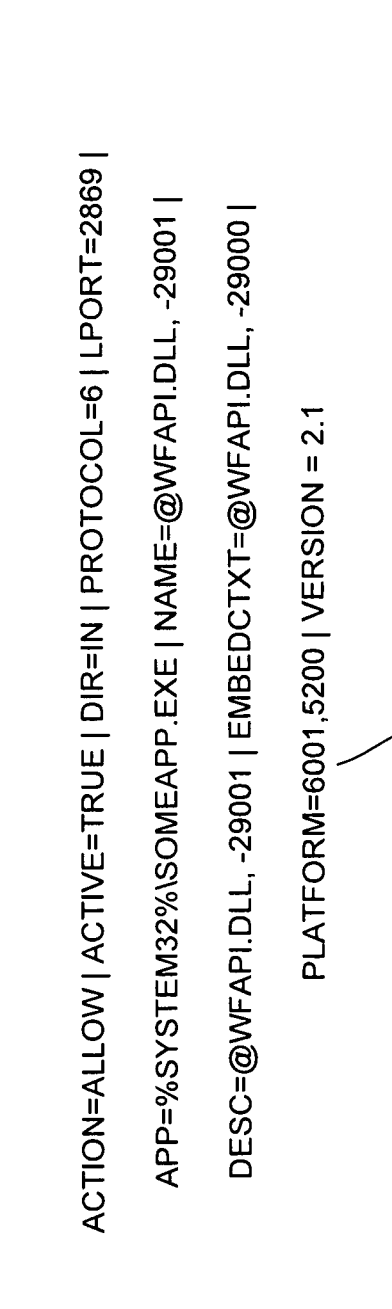
FIG. 19 illustrates an example of a targeting parameter in an object command.

FIG. 19 is an example of a policy deployment action, or command, 1900 that includes a targeting parameter 1905. In the example of FIG. 19 only platform versions 6001 and 5200 are to accept, or, alternately, use any deployed policy version.

In an embodiment, if a deployed policy version is compatible with a particular client or platform version but the client or platform version is not included in the targeting parameter 1905 then neither the non-targeted client nor the non-targeted platform will accept the policy version when it is deployed. In this embodiment for example, assume a policy version 5.3 is deployed and assume a platform version 5300 is compatible with policy version 5.3. Policy deployment action 1900, however, does not include platform version 5300 in the targeting parameter 1905. Thus, in this embodiment example platforms with version 5300 will not accept the policy version 5.3 when it is deployed.

In an alternate embodiment, if a deployed policy version is compatible with a particular client or platform version but the client or platform version is not included in the targeting parameter 1905 then the non-targeted client, or non-targeted platform, will accept and store the deployed policy version but will not thereafter implement, or otherwise enforce, the policy version. In this alternate embodiment, for example, assume a policy version 5.3 is deployed and assume a platform version 5300 is compatible with policy version 5.3. Policy deployment action 1900, as noted, does not include platform version 5300 in the targeting parameter 1905. In this alternate embodiment example policy version 5.3 will be deployed to and accepted and stored by platforms with version 5300. In this alternate embodiment example, however, policy version 5.3 will not thereafter be implemented, or otherwise enforced, by platforms with version 5300.

In another alternate embodiment, if a deployed policy version is compatible with a particular client or platform version but the client or platform version is not included in the targeting parameter 1905 then the compatible policy version will not be deployed to the client or platform version. In this other alternate embodiment for example, assume a policy version 5.3 is to be deployed and assume platform version 5300 is compatible with policy version 5.3. As noted however, policy deployment action 1900 does not include platform version 5300 in the targeting parameter 1905. Thus, in this other alternate embodiment example policy version 5.3 will not be deployed, or otherwise provided to, platform version 5300.

Figure 20:
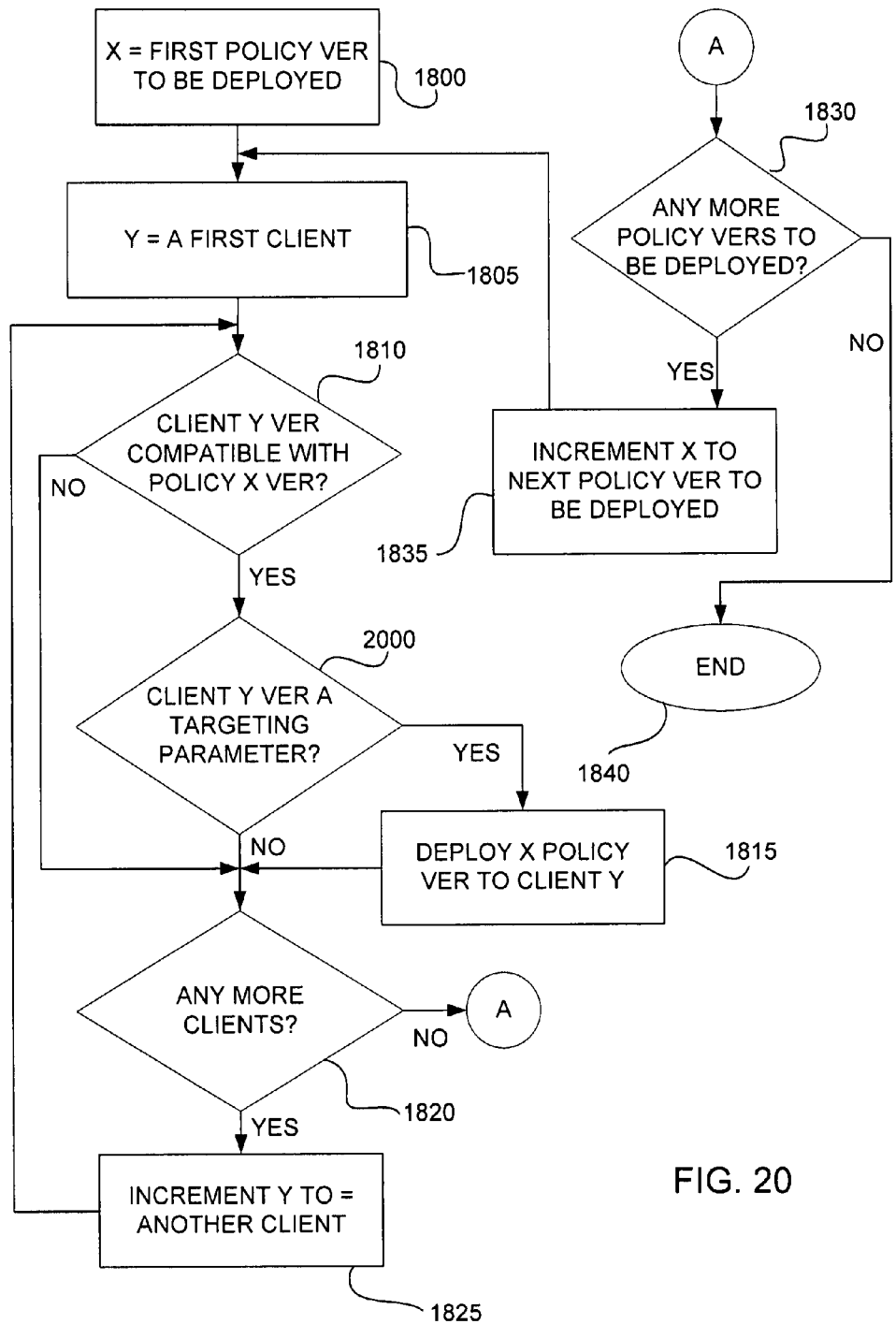
FIG. 20 illustrates an embodiment logic flow for a methodology for version targeting during policy deployment.

FIG. 20 illustrates an embodiment logic flow for a methodology for version targeting during policy deployment in a managed environment system 100. While the following discussion is made with respect to systems portrayed herein, the operations described may be implemented in other systems. Further, the operations described herein are not limited to the order shown. Additionally, in other alternative embodiments more or fewer operations may be performed.

For an embodiment policy deployment to one or more clients in a managed environment system, a first policy version x is identified 1800. A first client y in the managed environment system is also identified 1805. At decision block 1810 a determination is made as to whether client y's version is compatible with policy version x. If yes, at decision block 2000 a determination is made as to whether the client y version is a targeting parameter in the policy deployment action, or command. If yes, policy version x is deployed, or otherwise sent or made available, to client y 1815 and client y accepts the deployed policy version x.

If, however, at decision block 2000 the determination is made that client y's version is not a targeting parameter in the policy deployment action, the current policy x is not deployed to client y, or client y does not accept deployed policy version x, or client y accepts the deployed policy version x but will not thereafter implement it.

At decision block 1820 a determination is made as to whether or not there are any more clients in the managed environment system. If yes, y is incremented to a new client 1825 and the logic returns to decision block 1810 where a determination is made as to whether new client y's version is compatible with policy version x.

If at decision block 1820 it is determined that there are no more clients in the managed environment system then at decision block 1830 a determination is made as to whether there is another policy version to be deployed. If yes, x is incremented to a new policy version to be deployed 1835, a first client y is identified 1805, and the logic returns to decision block 1810 to determine whether client y's version is compatible with policy version x.

Once all the policy versions to be deployed have been deployed to one or more clients in the managed environment system the current policy deployment with version targeting is ended 1840.

Computing Device System Configuration

Figure 21:
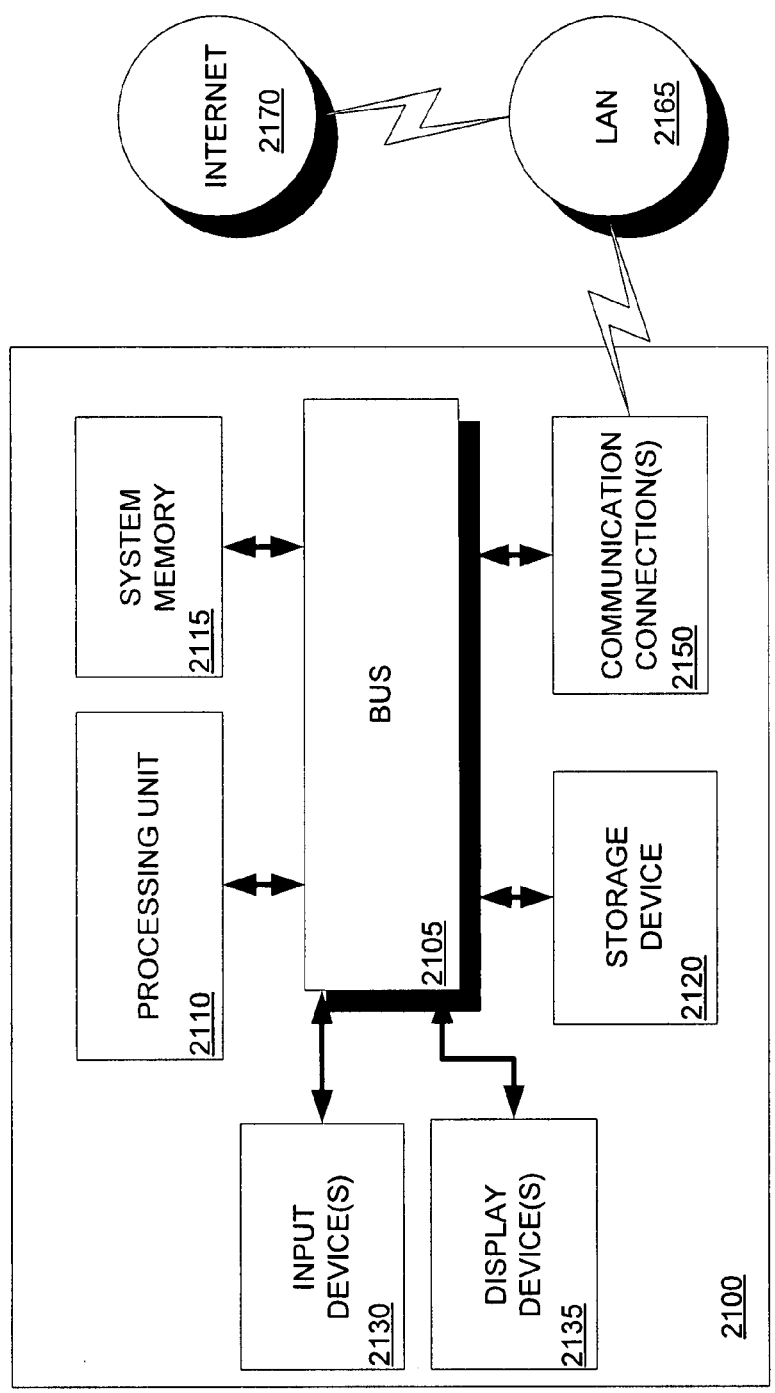
FIG. 21 is a block diagram of an exemplary basic computing device system that can process software, i.e., program code, or instructions.

FIG. 21 is a block diagram that illustrates an exemplary computing device system 2100 upon which an embodiment can be implemented. The computing device system 2100 includes a bus 2105 or other mechanism for communicating information, and a processing unit 2110 coupled with the bus 2105 for processing information. The computing device system 2100 also includes system memory 2115, which may be volatile or dynamic, such as random access memory (RAM), non-volatile or static, such as read-only memory (ROM) or flash memory, or some combination of the two. The system memory 2115 is coupled to the bus 2105 for storing information and instructions to be executed by the processing unit 2110, and may also be used for storing temporary variables or other intermediate information during the execution of instructions by the processing unit 2110. The system memory 2115 often contains an operating system and one or more programs, and may also include program data.

In an embodiment, a storage device 2120, such as a magnetic or optical disk, is also coupled to the bus 2105 for storing information, including program code comprising instructions and/or data.

The computing device system 2100 generally includes one or more display devices 2135, such as, but not limited to, a display screen, e.g., a cathode ray tube (CRT) or liquid crystal display (LCD), a printer, and one or more speakers, for providing information to a computing device user. The computing device system 2100 also generally includes one or more input devices 2130, such as, but not limited to, a keyboard, mouse, trackball, pen, voice input device(s), and touch input devices, which a computing device user can use to communicate information and command selections to the processing unit 2110. All of these devices are known in the art and need not be discussed at length here.

The processing unit 2110 executes one or more sequences of one or more program instructions contained in the system memory 2115. These instructions may be read into the system memory 2115 from another computing device-readable medium, including, but not limited to, the storage device 2120. In alternative embodiments, hard-wired circuitry may be used in place of or in combination with software program instructions. Thus, the computing device system environment is not limited to any specific combination of hardware circuitry and software.

The term "computing device-readable medium" as used herein refers to any medium that can participate in providing program instructions to the processing unit 2110 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 2115 and storage device 2120 of the computing device system 2100 are further examples of storage media. Examples of transmission media include, but are not limited to, wired media such as coaxial cable(s) and copper wire, and wireless media such as fiber optic signals, acoustic signals, RF signals and infrared signals.

The computing device system 2100 also includes one or more communication connections 2150 coupled to the bus 2105. The communication connection(s) 2150 provide a two-way data communication coupling from the computing device system 2100 to other computing devices on a local area network (LAN) 2165 and/or wide area network (WAN), including the World Wide Web, or Internet 2170. Examples of the communication connection(s) 2150 include, but are not limited to, an integrated services digital network (ISDN) card, modem, LAN card, and any device capable of sending and receiving electrical, electromagnetic, optical, acoustic, RF or infrared signals.

Communications received by the computing device system 2100 can include program instructions and program data. The program instructions received by the computing device system 2100 may be executed by the processing unit 2110 as they are received, and/or stored in the storage device 2120 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for interfacing a client comprising a processor, a user interface, and a policy structure comprising at least one policy object and having a client policy version with a remote server comprising the policy structure having a remote server policy version, the method comprising:
    executing on the processor instructions configured to:
        select an identified policy version that is compatible with the client policy version and the remote server policy version hosted by the remote server;
        store a policy handle for the identified policy version;
        interface the policy structure of the client with the policy structure of the remote server according to the identified policy version and the policy handle; and
        upon identifying at least one unsupported policy object that is included in the remote server policy version, where the unsupported policy object is applicable to the client and is not included in the identified policy version:
            ignore the at least one unsupported policy object while applying the policy objects of the policy structure that is included in the identified policy version; and
            send to the user interface a message indicating the at least one unsupported policy object to be ignored by the client while applying the policy structure.

2. The method of claim 1:
    the client comprising a management application and a client API, and
    the method comprising:
        the management application sending a request to the client API to open a remote policy store;
        the client API sending a request to the remote server for an identification of the remote server policy version; and
        the client API selecting the identified policy version between the client policy version and the remote server policy version.

3. The method of claim 2:
    the request to open a remote policy store comprising an identification of the client policy version, and
    the client API sending a request to the remote server to open the remote server policy store wherein the request to the remote server to open the remote server policy store comprises the identified policy version.

4. The method of claim 1:
    the client policy version comprising a client policy major version value and a client policy minor version value and the remote server policy version comprises a remote server policy major version value and a remote server policy minor version value, and
    selecting an identified policy version between the client policy version and the remote server policy version comprising:
        choosing the client policy version to be the identified policy version when the client policy major version value is less than the remote server policy major version value;
        choosing the remote server policy version to be the identified policy version when the remote server policy major version value is less than the client policy major version value;
        choosing the client policy version to be the identified policy version when the client policy major version value equals the remote server policy major version value and the client policy minor version value is less than the remote server policy minor version value; and
        choosing the remote server policy version to be the identified policy version when the remote server policy major version value equals the client policy major version value and the remote server policy minor version value is less than the client policy minor version value.

5. The method of claim 4, the message indicating the at least one unsupported policy object comprises a command processing message if the command failed to process.

6. The method of claim 1, comprising:
    sending an identified policy version command comprising an identified policy version value to the remote server wherein one or more objects are responsive to the identified policy version command and the one or more objects comprises at least one parameter and an object version value and wherein a first object of the one or more objects comprises an object version value that is greater than the identified policy version value; and
    receiving a response object from the remote server wherein the response object is the first object with at least one parameter stripped from the object.

7. The method for versioning management of claim 1, the client comprising a management application and a client API-comprising:
    the management application issuing an identified policy version command that comprises one or more objects as command parameters to the client API wherein the one or more objects comprise an associated object version value and the identified policy version comprises an identified policy version value;
    the client API checking whether the object version value associated with a first object of the one or more objects is greater than the identified policy version value;
    the client API stripping one or more parameters from the first object when the first object version value is greater than the identified policy version value to generate a stripped object;
    the client API forwarding the identified policy version command to the remote server wherein the stripped object replaces the first object as a parameter in the identified policy version command; and
    the client API passing an object status for the first object to the management application wherein the object status indicates that one or more parameters were stripped from the first object prior to the identified policy version command being forwarded to the remote server.

8. A method for deploying a policy structure to at least two clients by performing policy schema translation on a device having a processor, the method comprising:
   executing on the processor instructions configured to:
   interpret a translation collection hosted on a client to translate a policy version of the policy structure with a policy major version value hosted on the client to a translated policy version of the policy structure with a translated policy major version value that is smaller than the policy major version value;
   upon identifying at least one unsupported policy object that is included in the policy version, where the unsupported policy object is applicable to a client and is not supported by the translated policy version, exclude the at least one unsupported policy object from the translated policy version;
   deploy the policy version of the policy structure to one or more clients that support the policy major version value; and
   deploy the translated policy version of the policy structure excluding the at least one unsupported policy object to one or more clients that supports the translated policy major version value.

9. The method of claim 8:
   the client hosting the translation collection comprising a client API, and
   the client API using a schema translation engine to interpret the translation collection to generate the translated policy version, comprising:
   forwarding the policy version hosted on the client to a group policy object of the system to be deployed to one or more clients that support the policy major version value; and
   forwarding the translated policy version to the group policy object to be deployed to one or more clients that supports the translated policy major version value.

10. The method of claim 8:
    the deploying of the policy version and the deploying of the translated policy version performed in response to a policy deployment command received by the server, and
    the method comprising: deploying the policy structure to the one or more clients that support the policy major version value and are identified in a deployment command targeting parameter, and wherein the translated policy version is deployed to the one or more clients that support the translated policy major version value and are identified in a deployment command targeting parameter.

11. The method of claim 8:
    the method comprising: parameter stripping one or more parameters in the policy version to generate an intermediate policy version that is supported by the translation collection; and
    interpreting the translation collection hosted on a client to translate the policy version comprising: interpreting the translation collection to translate the intermediate policy version to a translated policy version.

12. The method translation of claim 8:
    the policy version comprising a new policy major version, and
    the method comprising: updating the translation collection to support translating the policy version to the translated policy version.

13. The method of claim 8 wherein the translated policy major version value is one less than the policy major version value.

14. The method of claim 8:
    the translated policy version comprising a first translated policy version and the translated policy major version value is a first translated policy major version value; and
    the method comprising:
    interpreting the translation collection hosted on a client of the system to translate the first translated policy version to a second translated policy version with a second translated policy major version value that is at least one less than the first translated policy major version value; and
    issuing a deployment command that will result in the deployment of the second translated policy version to clients that support the second translated policy major version value and that have been identified by a targeting parameter in the deployment command.

15. A method for deploying, on a server comprising a processor, a policy structure having a policy version in response to a policy deployment command specifying as a target parameter at least one client of a client set, respective clients supporting at least one policy version of the policy structure, the method comprising:
    executing on the processor instructions configured to:
    identify at least one client specified by the target parameter of the policy deployment command and supporting the policy version of the policy structure;
    upon identifying at least one unsupported policy object that is included in the policy version, where the unsupported policy object is applicable to the identified client and is not supported by the identified client, exclude the at least one unsupported policy object from the policy structure; and
    deploy the policy structure excluding the at least one unsupported policy object to at least one identified client.

16. The method of claim 15, comprising:
    identifying the at least one client comprising: identifying the at least one client on the server; and
    deploying the policy structure comprising: deploying the policy structure from the server to only the at least one identified client.

17. The method of claim 16, the server configured to identify the at least one client by:
    upon receiving from a client at least one client policy version value supported by the client, storing the at least one client policy version value associated with the client; and
    subsequently identifying the at least one client by comparing the policy version value of the policy structure to the at least one client policy version value stored with association to the at least one client.

18. The method of claim 16, the server configured to identify the at least one client by:
    for respective clients specified in a target parameter of the policy deployment command, query the client to determine whether the client supports the policy version of the policy structure; and
    upon receiving from the client a query reply verifying that the client supports the policy version of the policy structure, identifying the client for deployment of the policy structure.

19. The method of claim 15, deploying the policy structure to the at least one client comprising:

receiving by the client the policy version value of the policy structure from the server;

determining, by the client, whether the policy version value of the policy structure is supported by the client; and upon determining that the client supports the policy version value of the policy structure, storing on the client the policy structure received from the server.

20. The method of claim 15, deploying the policy structure to the at least one client comprising:

upon receiving on the client the policy structure from the server:

storing on the client the policy structure received from the server;

determining, by the client, whether the policy version value of the policy structure is supported by the client; and upon determining that the client supports the policy version value of the policy structure, implementing on the client the policy structure.

* * * * *